(12) United States Patent
Shim et al.

(10) Patent No.: US 10,700,521 B2
(45) Date of Patent: Jun. 30, 2020

(54) HIERARCHICAL TYPE POWER CONTROL SYSTEM

(71) Applicant: LSIS CO., LTD., Anyang-si, Gyeonggi-do (KR)

(72) Inventors: Jae-Seong Shim, Anyang-si (KR); Myung-Hwan Lee, Anyang-si (KR); Yong-Hark Shin, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 133 days.

(21) Appl. No.: 15/964,988

(22) Filed: Apr. 27, 2018

(65) Prior Publication Data

US 2018/0316187 A1    Nov. 1, 2018

(30) Foreign Application Priority Data

Apr. 28, 2017   (KR) .................. 10-2017-0055095
Apr. 28, 2017   (KR) .................. 10-2017-0055229

(51) Int. Cl.
*H02J 3/06* (2006.01)
*G05B 15/02* (2006.01)
(Continued)

(52) U.S. Cl.
CPC ............. *H02J 3/06* (2013.01); *G05B 15/02* (2013.01); *G06Q 10/04* (2013.01);
(Continued)

(58) Field of Classification Search
CPC .... G05B 15/02; G06Q 10/04; G06Q 10/0631; G06Q 50/06; H02J 13/0006;
(Continued)

(56) References Cited

U.S. PATENT DOCUMENTS 9,172,249 B2 * 10/2015 Rockenfeller ............ H02J 3/38
9,459,643 B2   10/2016 Miller et al.
(Continued)

FOREIGN PATENT DOCUMENTS

JP    2008125290 A    5/2008
JP    2013229978 A    11/2013
(Continued)

OTHER PUBLICATIONS

Annual Report of Korea Institute of Energy Technology Evaluation and Planning; published Apr. 29, 2016; accompanying English translation of summary; disclosure was derived directly from inventors (52 pages).
(Continued)

*Primary Examiner* — Kidest Bahta
(74) *Attorney, Agent, or Firm* — K&L Gates LLP

(57) ABSTRACT

The present disclosure relates to a hierarchical type power control system. The hierarchical type power control system connected to a cloud server includes: a first microgrid cell including a first energy storage system (ESS) having an uninterruptible power supply (UPS) structure and a first load that a power state thereof is managed by the first ESS; a second microgrid cell including a second load and a second ESS managing a power state of the second load; a third microgrid cell including a third load; a middleware server communicating with the first to third microgrid servers; and an integrated control system communicating the middleware server and integrally controlling power supply states of the first to third microgrid cells, wherein the first microgrid cell and the second microgrid cell are connected to each other through a converter to interchange power therebetween.

18 Claims, 25 Drawing Sheets

(51) Int. Cl.
   *H02J 13/00* (2006.01)
   *H02J 7/00* (2006.01)
   *H02J 9/06* (2006.01)
   *G06Q 50/06* (2012.01)
   *H02J 3/28* (2006.01)
   *G06Q 10/06* (2012.01)
   *G06Q 10/04* (2012.01)
   *H02J 3/14* (2006.01)

(52) U.S. Cl.
   CPC ......... *G06Q 10/0631* (2013.01); *G06Q 50/06* (2013.01); *H02J 3/28* (2013.01); *H02J 7/0068* (2013.01); *H02J 9/061* (2013.01); *H02J 9/066* (2013.01); *H02J 13/0006* (2013.01); *H02J 13/0079* (2013.01); *H02J 3/14* (2013.01)

(58) Field of Classification Search
   CPC .. H02J 13/0079; H02J 3/06; H02J 3/14; H02J 3/28; H02J 7/0068; H02J 9/061; H02J 9/066
   See application file for complete search history.

(56) References Cited

U.S. PATENT DOCUMENTS

| | | | | |
|---|---|---|---|---|
| 2003/0160595 A1* | 8/2003 | Provanzana | ............. | H02J 3/28 320/166 |
| 2006/0071554 A1* | 4/2006 | McNamara | ............. | H02J 3/005 307/10.1 |
| 2012/0101639 A1* | 4/2012 | Carralero | ................. | G06F 1/26 700/286 |
| 2013/0046140 A1* | 2/2013 | Pravong | ........... | A61B 17/32002 600/104 |
| 2013/0342018 A1* | 12/2013 | Moon | ...................... | H02J 3/32 307/80 |
| 2014/0077606 A1* | 3/2014 | Ci | ............................. | H02J 1/00 307/72 |
| 2014/0156101 A1* | 6/2014 | Miller | .................... | G06F 1/263 700/298 |
| 2015/0214737 A1 | 7/2015 | Ichino | | |

FOREIGN PATENT DOCUMENTS

| | | |
|---|---|---|
| JP | 2016189691 A | 11/2016 |
| KR | 20140065573 A | 5/2014 |
| KR | 20150136171 A | 12/2015 |
| KR | 20160000285 A | 1/2016 |
| KR | 20160049446 A | 5/2016 |
| KR | 101690742 B1 | 12/2016 |
| WO | 2015134851 A1 | 9/2015 |
| WO | 2016021179 A1 | 2/2016 |

OTHER PUBLICATIONS

Choi Sang-Ho, et al.; "Suggestion for development of BEMS (Building Energy Management System) business"; (9 pages)—Cited in Korean Office Action dated Apr. 19, 2018.

Hak-Ju Lee, et al.; "The Development & Performance Test of 10 [kW] Power Conditioning System for Microgrid"; accessed Apr. 17, 2018; (9 pages)—Cited in Korean Office Action dated Apr. 19, 2018.

Korean Office Action for related Korean Application No. 10-2017-0055229; action dated Apr. 19, 2018; (11 pages).

Korean Office Action for related Korean Application No. 10-2017-0055095; action dated May 9, 2018; (4 pages).

\* cited by examiner

HIERARCHICAL TYPE POWER CONTROL SYSTEM

CROSS-REFERENCE TO RELATED APPLICATIONS

Pursuant to 35 U.S.C. § 119(a), this application claims the benefit of earlier filing date and right of priority to Korean Application No. 10-2017-0055229 filed on Apr. 28, 2017 and Korean Application No. 10-2017-0055095 filed on Apr. 28, 2017 in the Korean Intellectual Property Office, the disclosure of which is hereby incorporated by reference in its entirety.

BACKGROUND

1. Technical Field

The present disclosure relates to a hierarchical type power control system.

2. Description of the Related Art

An Energy Storage System (ESS) stores generated power in linked systems including power plants, substations, transmission lines, etc., and then uses energy selectively and efficiently when necessary, to thereby increase the energy efficiency.

The ESS can reduce the deviations in electrical loads depending on time zones and seasons, thereby improving the overall load to lower the cost of generating electric power. Accordingly, the investment cost and operating cost required for expanding electric power facility can be reduced, such that electricity rates can be lowered and the energy can be saved.

Such ESSs are installed in power generation, transmission, distribution, and customers in power systems. They are used for frequency regulation, generator output stabilization using new and renewable energy, peak shaving, load leveling, emergency power, and so on.

ESSs are divided into physical energy storage and chemical energy storage depending on the storage manner. Physical energy storage includes method using pumped storage generation, compressed air storage, and flywheels. Chemical energy storage includes method using lithium ion batteries, lead acid batteries, and NaS batteries.

However, such ESSs may manage only power state of areas (e.g., a unit of microgrid) or buildings which are directly managed by the ESSs. The ESSs may not help with a power shortage problem of an adjacent area or building in consideration of a current power supply state of the adjacent area or building when the adjacent area or building is in a difficult situation due to a power shortage.

In particular, during peak control or grid failure, a specific area or building is able to be independently supplied with the power and thus has surplus power, while there was problem that other areas or buildings suffer from difficulty due to the power shortage.

In order to solve the above-mentioned problems, there is a need for a system capable of integrally and efficiently managing the power of adjacent areas of a unit of microgrid.

SUMMARY

It is an object of the present disclosure is to provide a hierarchical type power control system capable of integrally and efficiently controlling a power supply state of microgrid cells which are adjacent to each other.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with an aspect of the present disclosure, a hierarchical type power control system connected to a cloud server includes a first microgrid cell including a first energy storage system (ESS) having an uninterruptible power supply (UPS) structure and a first load that a power state thereof is managed by the first ESS; a second microgrid cell including a second load and a second ESS managing a power state of the second load; a third microgrid cell including a third load; a middleware server communicating with the first to third microgrid servers; and an integrated control system communicating the middleware server and integrally controlling power supply states of the first to third microgrid cells, wherein the first microgrid cell and the second microgrid cell are connected to each other through a converter to interchange power therebetween.

The first microgrid cell may further include a first sensor sensing the power state of the first load, the second microgrid cell further includes a second sensor sensing the power state of the second load, the third microgrid cell further includes a third sensor sensing a power state of the third load, and the first to third sensor sense the power states of the first to third loads, respectively, to transmit the sensed power state to the cloud server.

The cloud server may receive at least one of weather data and power related data from the outside, synthetically analyze the power states of the first to third loads provided from the first to third sensors and at least one of the weather data and the power related data received from the outside, and provide the analysis result to the middleware server.

The middleware server may provide the provided analysis result and real time power state information provided from each of the first to third microgrid cells to the integrated control system, and the integrated control system may integrally control the power supply states of the first to third microgrid cells based on the analysis result and the real time power state information of the first to third microgrid cells provided from the middleware server.

The first ESS may supply the power to the first load in an uninterrupted manner when a grid is interrupted or restored.

The first microgrid cell may further include an emergency generator; a static transfer switch opening and closing a connection between a grid and the first ESS and a connection between the grid and the first load; and a first energy management system (EMS) controlling the emergency generator and the first ESS.

The integrated control system may determine a power interchange amount value by calculating surplus power and shortage power of each of the first and second microgrid cells, and provide the determined power interchange amount value to a microgrid cell having the surplus power among the first microgrid cell and the second microgrid cell through the middleware server.

When the first microgrid cell has the surplus power, the first EMS may receive the determined power interchange amount value from the middleware server and transfer the received determined power interchange amount value to the first ESS, and the first ESS may control a charging and discharging amount of a battery based on the transferred determined power interchange amount value and then supply the power to the second microgrid cell through the converter.

The second load may include one or more loads having different priorities, the integrated control system may determine the power interchange amount value based on a surplus power amount of the first microgrid cell and a shortage power amount required by a load having a high priority among the loads of the second load, and the first ESS may control the charging and discharging amount of the battery based on the determined power interchange amount value and then supply the power to the load having the high priority among the loads of the second load.

The integrated control system may determine a power interchange amount value by calculating surplus power and shortage power of each of the first and second microgrid cells, and provide the determined power interchange amount value to a microgrid cell having the surplus power among the first microgrid cell and the second microgrid cell through the middleware server.

The first microgrid cell may include a first EMS that integrally controls the first ESS and the first load, when the first microgrid cell has the surplus power, the first EMS may receive the determined power interchange amount value from the middleware server and transfer the received determined power interchange amount value to the first ESS, and the first ESS may control a charging and discharging amount of a battery based on the transferred determined power interchange amount value and then supply the power to the second microgrid cell through the converter.

The second load may include one or more loads having different priorities, the integrated control system may determine the power interchange amount value based on a surplus power amount of the first microgrid cell and a shortage power amount required by a load having a high priority among the loads of the second load, and the first ESS may control the charging and discharging amount of the battery based on the determined power interchange amount value and then supply the power to the load having the high priority among the loads of the second load.

The converter may include an alternating current (AC)-direct current (DC) converter and a DC-AC converter which are connected in series with each other.

When the second microgrid cell has shortage power, the first microgrid cell may provide an AC voltage to the AC-DC converter, the AC-DC converter may convert the AC voltage provided from the first microgrid cell into a DC voltage to provide the DC voltage to the DC-AC converter, and the DC-AC converter may again convert the DC voltage provided from the AC-DC converter into the AC voltage to provide the AC voltage to the second microgrid cell.

A power interchange priority of the first load may be higher than the power interchange priority of each of the second load and the third load.

The first microgrid cell may further include a building energy management system (BEMS), a panel board communicating with the BEMS, a building automation system (BAS) communicating with the BEMS, an cooling/heating system connected to the BAS, a first distributed power system connected to the BAS, and a third ESS connected to the BAS, and the BEMS may reduce a peak load by controlling at least one of the cooling/heating system, the first distributed power system, and the third ESS through the BAS.

The second microgrid cell may further include a second distributed power system connected to the second ESS to be driven, and a second EMS controlling the second ESS and the second distributed power system.

In accordance with another aspect of the present disclosure, a hierarchical type power control system connected to a cloud server includes a first microgrid cell including an emergency generator that a connection with a grid is opened and closed through a closed transition transfer switch (CTTS), a first energy storage system (ESS) connected to the emergency generator to be driven, and a first load that a power state thereof is managed by the first ESS; a second microgrid cell including a second load and a second ESS managing a power state of the second load; a third microgrid cell including a third load; a middleware server communicating with the first to third microgrid servers; and an integrated control system communicating the middleware server and integrally controlling the first to third microgrid cells, wherein the first microgrid cell and the second microgrid cell are connected to each other through a converter to interchange power therebetween.

In accordance with another aspect of the present disclosure, a hierarchical type power control system connected to a cloud server includes a first microgrid cell including a first energy storage system (ESS) having an uninterruptible power supply (UPS) structure and a first load that a power state thereof is managed by the first ESS; a second microgrid cell including a second load and a second ESS managing a power state of the second load; a third microgrid cell including a third load; a middleware server communicating with the first to third microgrid servers; and an integrated control system communicating the middleware server and integrally controlling power supply states of the first to third microgrid cells, wherein a connection between the first microgrid cell and the second microgrid cell is opened and closed through a conversion switch.

The conversion switch may be any one of a transfer switch (TS), a static transfer switch (STS), a back-to-back converter, and an automatic load transfer switch (ALTS).

DETAILED DESCRIPTION

Figure 1:
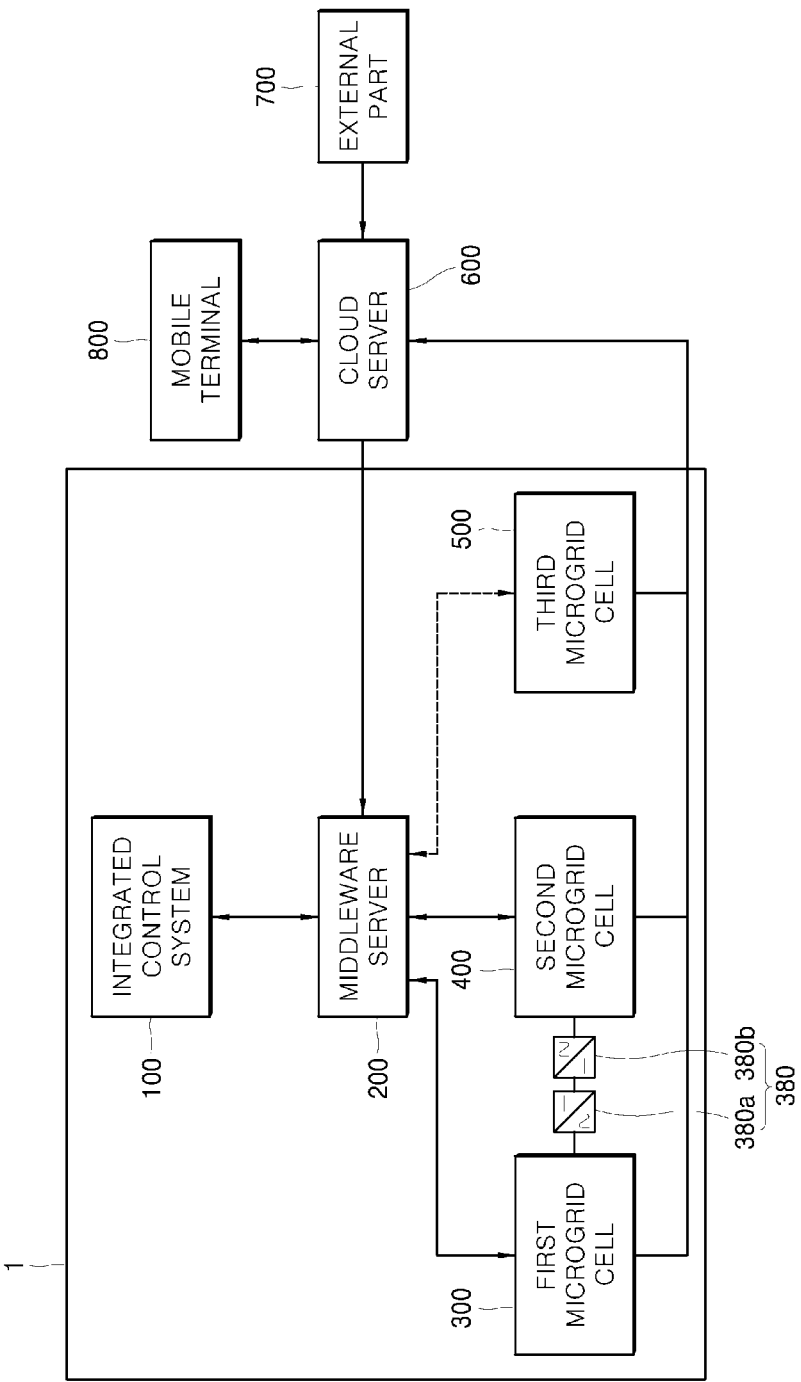
FIG. 1 is a diagram schematically illustrating a hierarchical type power control system according to an exemplary embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Hereinafter, a hierarchical type power control system according to an exemplary embodiment of the present disclosure will be described with reference to FIGS. 1 to 3.

FIG. 1 is a diagram schematically illustrating a hierarchical type power control system according to an exemplary embodiment of the present disclosure. FIG. 2 is a diagram schematically illustrating first to third microgrid cells of FIG. 1. FIG. 3 is a diagram schematically illustrating the first microgrid cell of FIG. 2.

Figure 2:
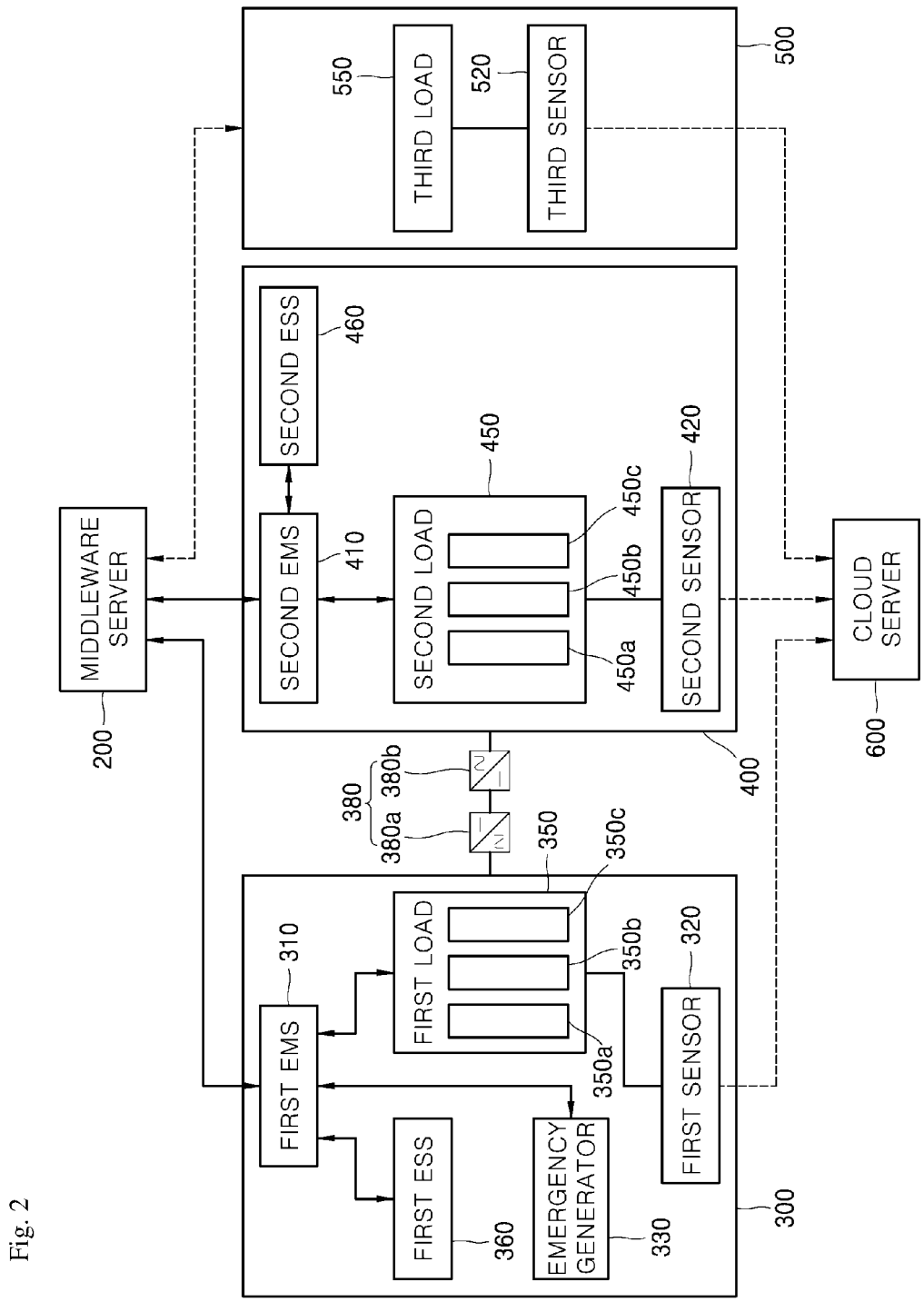
FIG. 2 is a diagram schematically illustrating first to third microgrid cells of FIG. 1.

Referring to FIGS. 1 and 2, a hierarchical type power control system 1 according to an exemplary embodiment of the present disclosure may include an integrated control system 100, a middleware server 200, a first microgrid cell 300, a second microgrid cell 400, and a third microgrid cell 500.

For reference, the hierarchical power control system of FIG. 1 may further include a cloud server 600, but the present disclosure will be described as an example in which the hierarchical type power control system 1 does not include the cloud server 600, for convenience of explanation.

In addition, although not illustrated in the drawings, the hierarchical type power control system 1 of FIG. 1 may further include a grid. Here, the grid may exist in each of the first to third microgrid cells 300, 400, and 500, but only one grid common to the first to third microgrid cells 300, 400, and 500 may also exist.

In addition, the grid may include, for example, power plants, substations, transmission lines, and the like.

The integrated control system 100 may communicate with the middleware server 200, and may integrate and control a power supply state of the first to third microgrid cells 300, 400, and 500.

Specifically, the integrated control system 100 may be design to have an integrated monitor and control function, and an optimum electricity generation and control function.

The integrated monitor and control function may include, for example, a monitoring function, a control function, a reporting function, an alarming function, a calculation function, a database (DB) management function, a trend function, a screen display function.

Here, the monitoring function may include a state/fault monitoring and measuring function of the first to third microgrid cells 300, 400, and 500, and the control function may include a drive/stop/scheduling and optimum driving control function of facilities included in the first to third microgrid cells 300, 400, and 500.

The reporting function may include a function of providing periodical measurement information and operation/maintenance records for the first to third microgrid cells 300, 400, and 500, and the alarming function may include an alarm recognition process and storage function.

The calculation function may include a function of providing a calculation/function to data requiring a calculation such as power factor or the like, and the DB management function may include a data interface function through a real time database application program interface (API).

The trend function may include a function of monitoring a change trend of data, and the screen display function may include a function of displaying monitor, event, alarm, authority, and the like on a screen (e.g., a screen of the integrated control system 100 or a screen of a mobile terminal 800 which is interlocked via the cloud server 600).

Meanwhile, the optimum electricity generation and control function may include, for example, a load prediction function, a sunlight generation prediction function, an optimum electricity generation plan establishment function, an economical feeding function, an automatic electricity generation control function, a provisional calculation function, a load shedding function, an islanding algorithm performing function.

Here, the load prediction function may include a function of designing by applying an ensemble multiple module combination algorithm that derives results using various prediction algorithms and a function of acquiring history data of the load in the grid and storing it in an oracle DB.

The sunlight generation prediction function may include a function of predicting an amount of electricity generation using a K-mean Cluster method by patterning a precipitation probability based on precipitation information provided from the external part 700 (e.g., a weather center) through the cloud server 600, and a function of designing an algorithm by dividing into a prediction associated with the weather center and a prediction which is not associated with the weather center.

The optimum electricity generation plan establishment function may include a function of establishing the respective optimum electricity generation plans in consideration of the power supply states of the first to third microgrid cells 300, 400, and 500.

The economical feeding function may include a function of determining an output of a heat/electricity energy source for an energy source driven by the result of the optimum electricity generation plan and deriving results which are divided in a unit of the microgrid cell.

The automatic electricity generation control function may include a function of designing to follow targets of a grid associated mode (associated stream maintenance) and an independent driving mode (maintains frequency).

The provisional calculation function may include a function of calculating power rates based on history data of electricity consumption.

The load shedding function may include a function of shedding a load by a priority when a reference value is exceeded.

The islanding algorithm performing function may include a function of searching for power interchange and load shedding method during an independent driving.

The integrated control system 100 may receive a variety of information from the middleware server 200 and may integrally control the power supply states of the first to third microgrid cells based on the variety of information.

A detailed description thereof will be described below.

The middleware server 200 may communicate with the first to third microgrid cells 300, 400, and 500.

For reference, the middleware server 200 does not separately exit, and may also be included in the integrated control system 100. In this case, the integrated control system 100 may directly communicate with the first to third microgrid cells 300, 400, and 500 or the cloud server 600.

However, for convenience of explanation, the present disclosure will be described as an example in which the middleware server 200 exists separately from the integrated control system 100.

Specifically, the middleware server 200 may provide real time power state information provided from each of the first to third microgrid cells 300, 400, and 500 to the integrated control system 100, and may provide a control command or signal provided from the integrated control system 100 to the first to third microgrid cells 300, 400, and 500.

In addition, the middleware server 200 may receive an analysis result from the cloud server 600.

For reference, the cloud server 600 may receive at least one of weather data and power related data from the external part 700 (e.g., a weather center or Korean electric power corporation), and may receive power states of first to third loads 350, 450, and 550 from first to third sensors 320, 420, and 520, respectively.

In addition, the cloud server 600 may synthetically analyze at least one of the power states of the first to third loads 350, 450, and 550 received from the first to third sensors 320, 420, and 520, and the weather data and the power related data received from the outside, and may provide an analysis result to the middleware server 200.

That is, the middleware server 200 may provide the analysis result provided from the cloud server 600 and the real time power state information provided from the first to third microgrid cells 300, 400, and 500, respectively, to the integrated control system.

Thereby, the integrated control system 100 may integrally control the power supply states of the first to third microgrid cells 300, 400, and 500 based on the analysis result and the real time power state information of the first to third microgrid cells 300, 400, and 500 provided from the middleware server 200.

In addition, the cloud server 600 may be interlocked with the mobile terminal 800 to transmit power related information to the mobile terminal 800, thereby allowing a user to detect a power state of each of the first to third microgrid cells 300, 400, and 500 in real time through the mobile terminal 800.

The first microgrid cell 300 may include a first electronic switching system (ESS) having an uninterrupted power supply (UPS) structure and a first load 350 in which a power state is managed by the first ESS 360.

Figure 3:
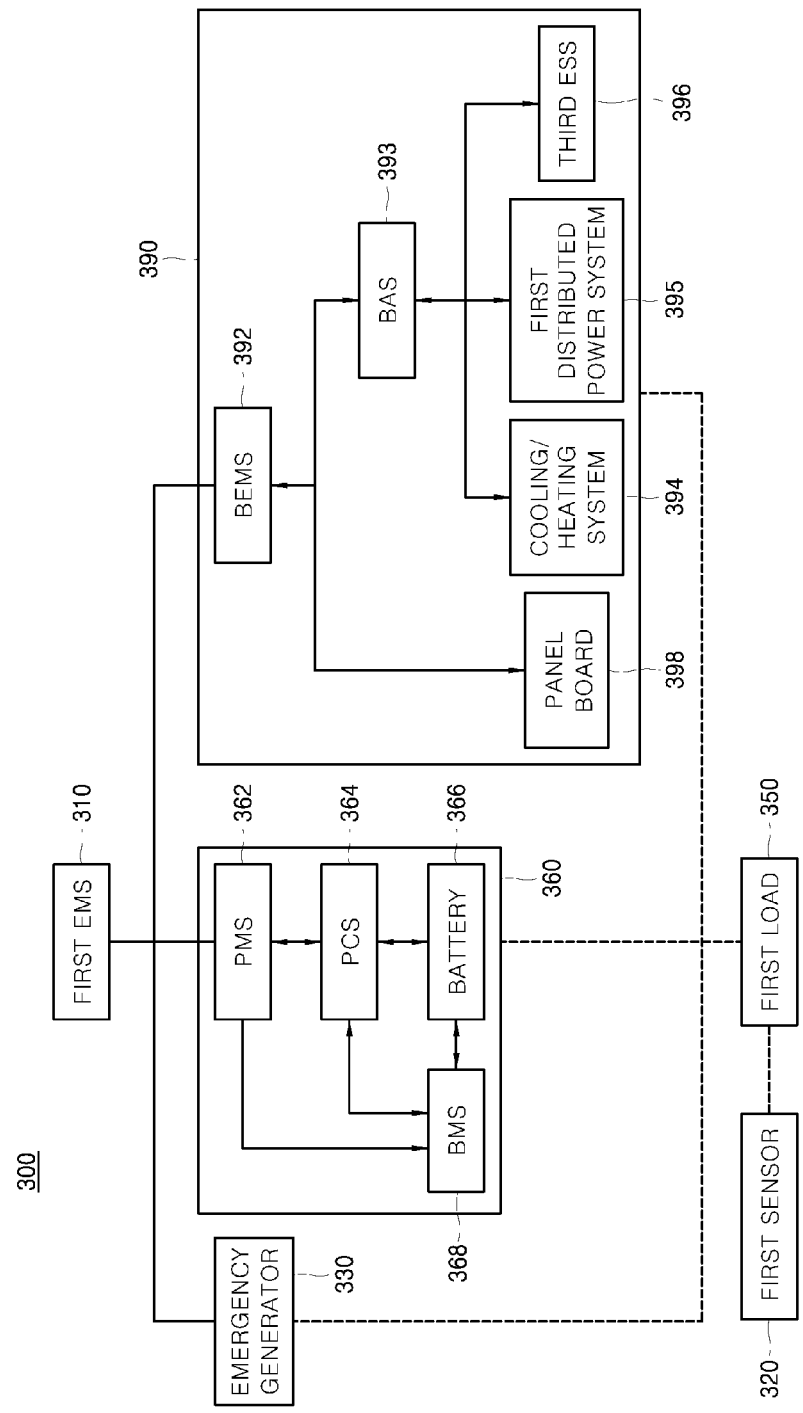
FIG. 3 is a diagram schematically illustrating the first microgrid cell of FIG. 2.
Figure 4:
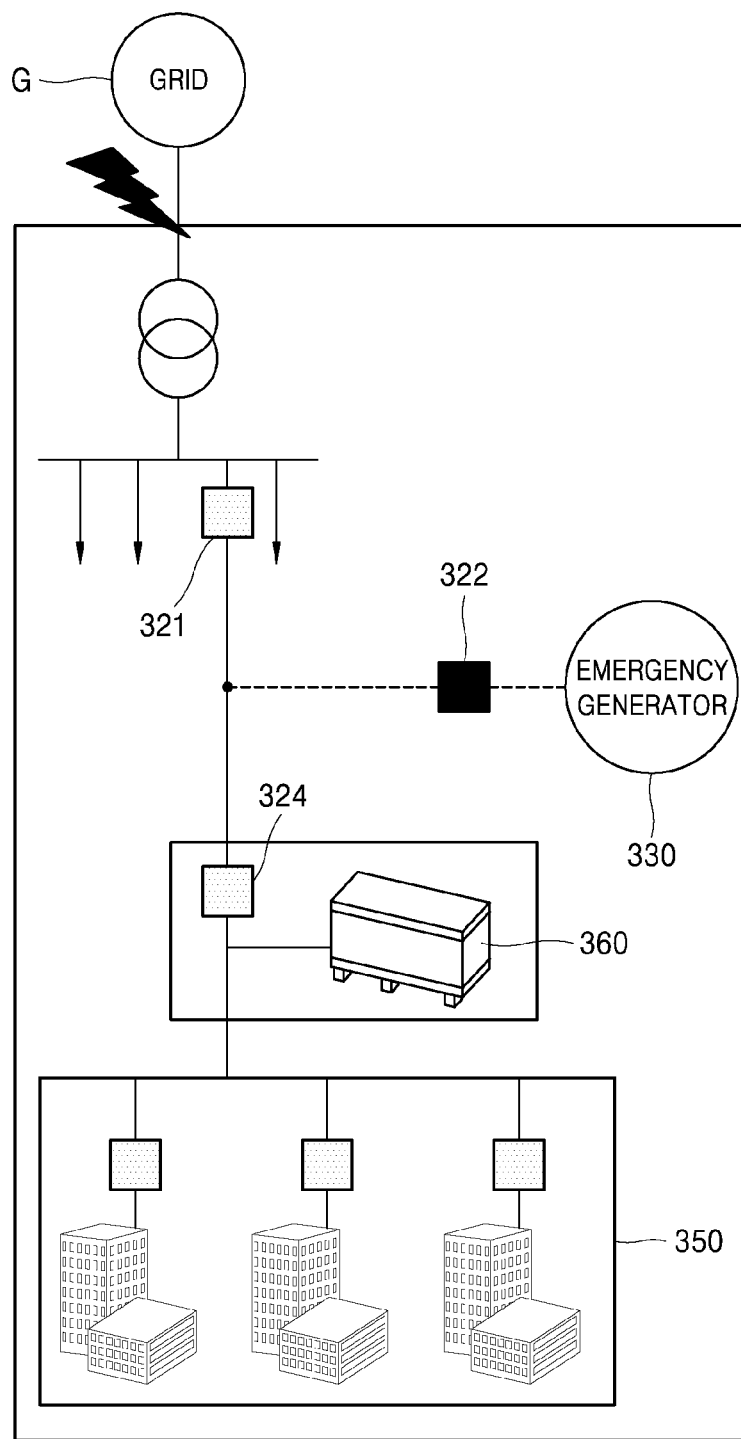
FIGS. 4 to 11 are diagrams schematically illustrating one example of an independent driving method of the first microgrid cell of FIG. 3 at the time of a grid interruption.
Figure 5:
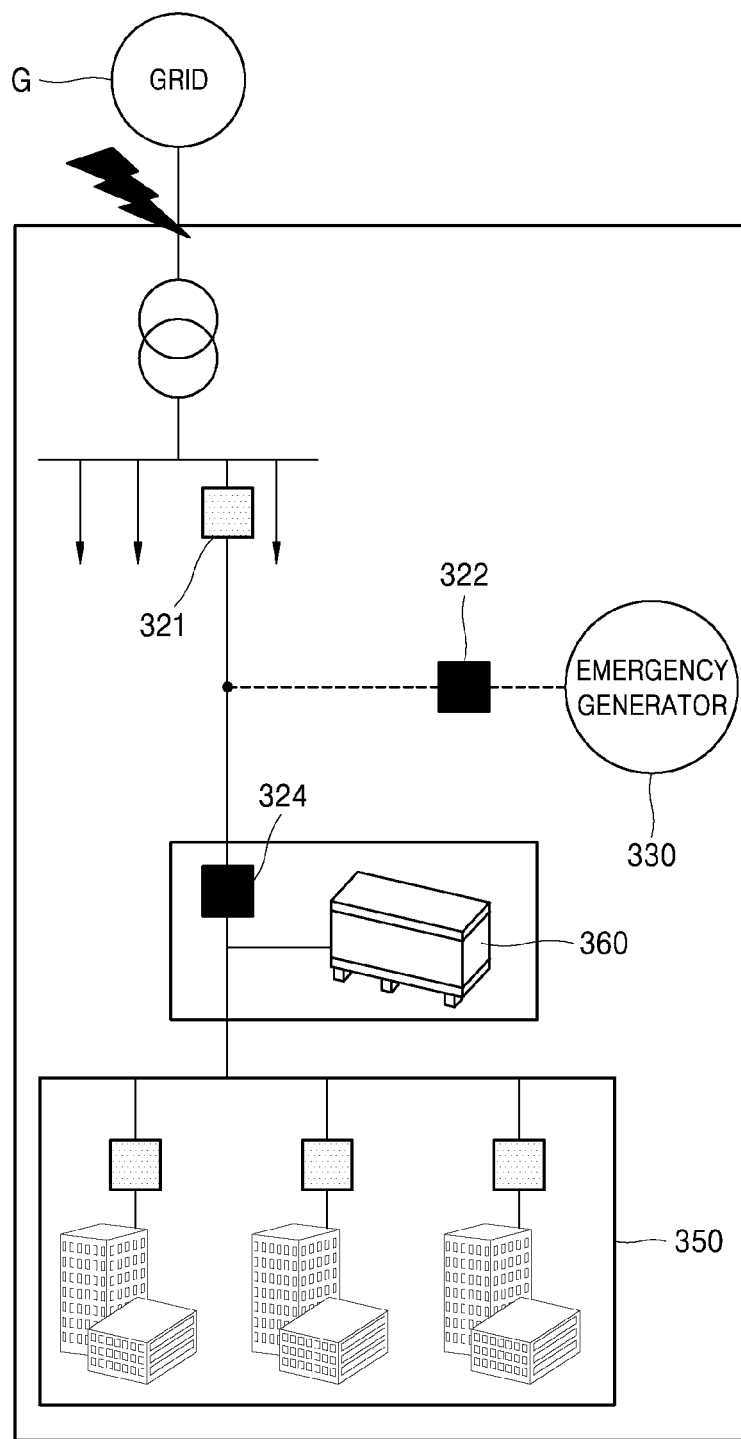
Figure 6:
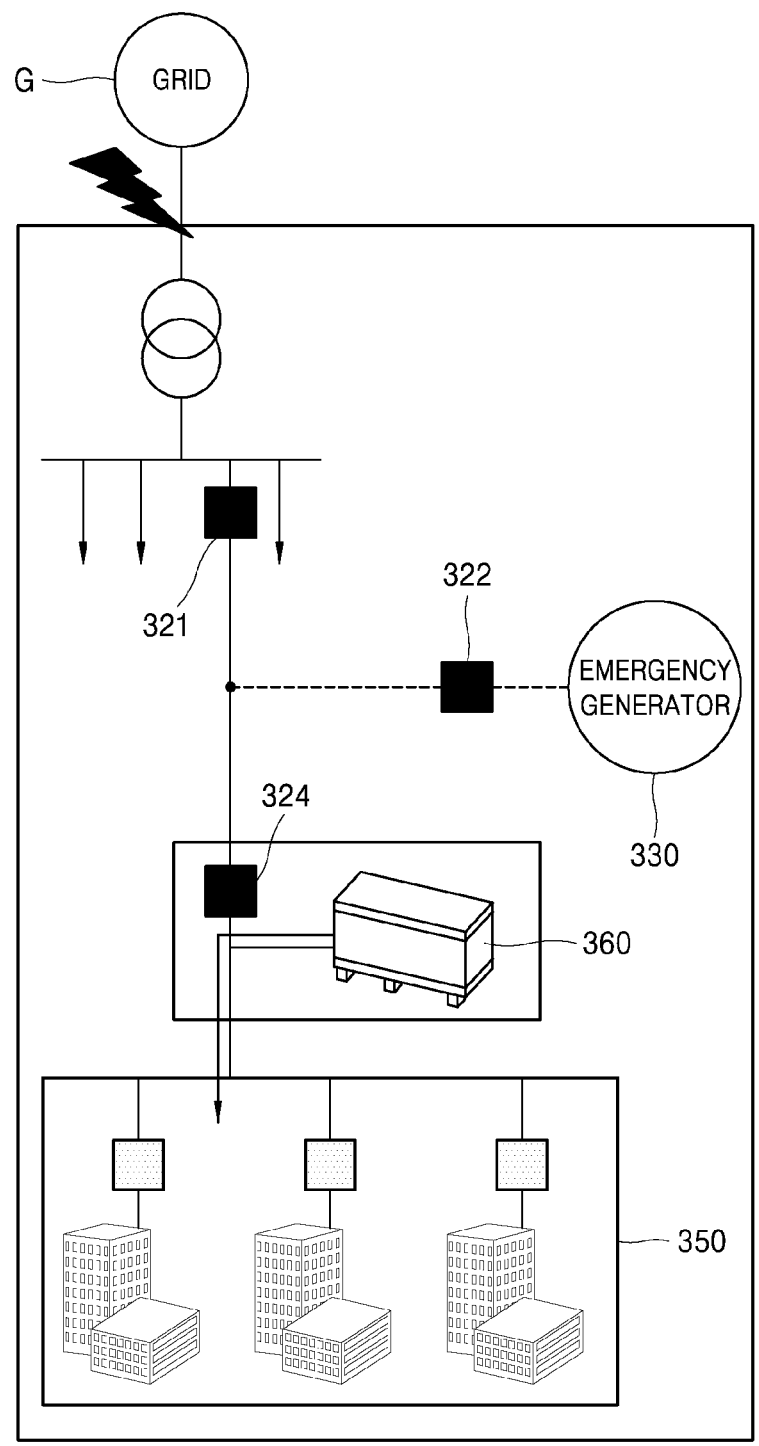

Specifically, referring to FIGS. 2 and 3, the first microgrid cell 300 may include a first energy management system (EMS) 310, a first sensor 320, an emergency generator 330, a first ESS 360, a building related power system 390, and a first load 350.

For reference, the first microgrid cell 300 may not include the emergency generator 330. In this case, when the grid is interrupted or restored, the first ESS 360 having the UPS structure may supply the power to the first load 350 in an uninterrupted manner.

However, for convenience of explanation, the present disclosure will be described as an example in which the first microgrid cell 300 includes the emergency generator 330.

The first EMS 310 may control the emergency generator 330 and the first ESS 360.

Specifically, the first EMS 310 may serve to manage all of the components (i.e., the first sensor 320, the emergency generator 330, the first ESS 360, the building related power system 390, and the first load 350) included in the first microgrid cell 300.

In addition, since the first EMS 310 may communicate with the middleware server 200, the first EMS 310 may transmit the power related data of the first microgrid cell 300 to the middleware server 200 or may receive a control signal or command of the integrated control system 100 from the middleware server 200.

For reference, the first EMS 310 may generate information about maintenance of a battery 366 based on data about the battery 366 provided from a power management system (PMS) 362, and may provide the generated information about the maintenance of the battery 366 to a battery management system (BMS) 368 that manages the battery 366 through the PMS 362.

The first sensor 320 may sense a power state of the first load 350.

Specifically, the first sensor 320 may be, for example, an IoT sensor having a communication function, and may sense the power state (e.g., whether or not power is insufficient, whether or not power is excessive, and the like) of the first load 350 to provide the sensed information to the cloud server 600.

The emergency generator 330 may be driven by the first EMS 310 when the grid is interrupted.

Specifically, the emergency generator 330 may be, for example, a diesel generator, and may be driven to be interlocked with the first ESS 360 to thereby allow an uninterruptible independent driving of the first microgrid cell 300 to be maintained for a certain time (e.g., four hours) when the grid is interrupted.

For reference, a conventional diesel generator is utilized as the emergency generator 330 and a small capacity ESS is used as the first ESS 360, thereby making it possible to reduce initial investment costs. In addition, since a long time or a non-limiting independent driving is possible through the emergency generator 330, reliability of power supply may be secured, and it is possible to secure economical efficiency through a reduction in a peak load by enabling a planned independent driving.

The first ESS 360 may have the UPS structure and may be designed to be capable of interruptible independent driving in case of an accident such as grid interruption or the like, thereby enabling a reliable power supply.

Specifically, the first ESS 360 may supply the power to the first load 350 in an uninterrupted manner based on the UPS structure when the grid is interrupted or restored, and may manage the power state of the first load 350.

Here, the first ESS 360 may include a PMS 362, a PCS 364, a battery 366, and a BMS 368.

The PCS may store power generated in a distributed power system (not shown, for example, a new and renewable energy system such as sunlight or wind power) in the battery 366, or may transfer it to the grid and the first load 350. In addition, the PCS 364 may transfer the power stored in the battery 366 to the grid or the first load 350. The PCS 364 may also store the power supplied from the grid in the battery 366.

In addition, the PCS 364 may control a charging and a discharging of the battery 366 based on a state of charge (hereinafter, referred to as "SOC level") of the battery 366.

For reference, the PCS 364 may generate a schedule for an operation of the first ESS 360 based on a power price in a power market, a power generation plan of the distributed power system, and a power demand of the grid.

The battery 366 may be charged or discharged by the PCS 364.

Specifically, the battery 366 may be supplied with one or more of powers of the distributed power system and the grid to store the supplied power, and may supply the stored power to one or more of the grid and the first load 350. Such a battery 366 may include one or more battery cells, and each battery cell may include a plurality of bear cells.

The BMS 368 may monitor a state of the battery 366 and may control a charging and discharging operation of the battery 366. In addition, the BMS 368 may monitor the state of the battery 366 including the SOC level, which is a charged state of the battery 366, and may provide information (e.g., a voltage, a current, a temperature, a residual power amount, a lifespan, a charged state, and the like) on the monitored state of the battery 366 to the PCS 364.

In addition, the BMS 368 may perform a protection operation for protecting the battery 366. For example, the BMS 368 may perform one or more of an over-charging protection function, an over-discharging protection function, an over-current protection function, an over-voltage protection function, an over-heat protection function, and a cell balancing function.

In addition, the BMS 368 may adjust the SOC level of the battery 366.

Specifically, the BMS 368 may receive a control signal from the PCS 364 and may adjust the SOC level of the battery 366 based on the received control signal.

The PMS 362 may control the PCS 364 based on data related to the battery 366 which is provided from the BMS 368.

Specifically, the PMS 362 may monitor a state of the battery 366 and may monitor a state of the PCS 364. That is, the PMS 362 may control the PCS 364 according to efficiency thereof based on the data related to the battery 366 which is provided from the BMS 368.

In addition, the PMS 362 may provide battery related data collected by monitoring the state of the battery 366 through the BMS 368 to the first EMS 310.

The building related power system 390 may include a building energy management system (BEMS) 392, a panel board 398, a building automation system (BAS) 393, a cooling/heating system 394, a first distributed power system 395, and a third ESS 396.

Specifically, the BEMS 392 may control at least one of the cooling/heating system 394, the first distributed power system 395, and the third ESS 396 through the BAS 393, thereby reducing a peak load and also controlling the panel board 398.

In addition, the panel board 398 and the BAS 393 may be controlled by communication with the BEMS 392, and the cooling/heating system 394, the first distributed power system 395, and the third ESS 396 may be connected to the BAS 393 so as to be controlled by the BEMS 392.

The building related power system 390 may be optimally controlled to reduce energy, thereby reducing energy costs and peak load.

A power state of the first load 350 may be managed by the first ESS 360, and the first load 350 may include, for example, a home, a large building, a factory, and the like.

Specifically, a power supply of the first load 350 may be managed by at least one of the first ESS 360, the emergency generator 330, and the building related power system 390 and the first load 350 may be connected to the first sensor 320.

For reference, the first load 350 may be an important load (e.g., laboratory building, hospital, and the like) that requires an uninterruptible high quality power supply.

Accordingly, when a power interchange work of the integrated control system 100 is performed, a power interchange priority of the first load 350 may be higher than the power interchange priority of each of the second load 350 and the third load 550.

The second microgrid cell 400 may include a second load 450 and a second ESS 460 that manages a power state of the second load 450.

Specifically, the second microgrid cell 400 may include a second EMS 410, a second sensor 420, a second load 450, and a second ESS 460.

For reference, although not illustrated in the drawing, the second microgrid cell 400 may further include a second distributed power system (not shown, for example, a new and renewable energy system such as wind power or sunlight) driven in conjunction with the second ESS 460.

The second EMS 410 may control the second ESS 460 and the second distributed power system.

Specifically, the second EMS 410 may serve to manage all of the components (i.e., the second sensor 420, the second load 450, the second ESS 460, and the second distributed power system) included in the second microgrid cell 400.

In addition, since the second EMS 410 may communicate with the middleware server 200, the second EMS 410 may transmit the power related data of the second microgrid cell 400 to the middleware server 200 or may receive a control signal or command of the integrated control system 100 from the middleware server 200.

The second sensor 420 may sense a power state of the second load 450.

Specifically, the second sensor 420 may be, for example, an IoT sensor having a communication function, and may sense the power state (e.g., whether or not power is insufficient, whether or not power is excessive, and the like) of the second load 450 to provide the sensed information to the cloud server 600.

The power state of the second load 450 may be managed by the second ESS 460, and the second load 450 may include, for example, a home, a large building, a factory, and the like.

Specifically, a power supply of the second load 450 may be managed by the second ESS 460, and the second load 450 may be connected to the second sensor 420.

For reference, the second load 450 may be a general load (e.g., a classroom building, a dormitory, and the like) that requires energy efficiency through a connection with the second distributed power system.

In addition, the second load 450 may include one or more loads 450a to 450c having different priorities.

Therefore, when the power in the second microgrid cell 400 becomes insufficient due to the peak control or the grid interruption and the second microgrid cell 400 is thus supplied with the power from the first microgrid cell 300, a load having a high priority among the loads of the second load 450 may be first selected and may be supplied with the power.

That is, the load (e.g., 450a) having the high priority among the loads of the second load 450 may be driven by being interchanged with the power from the first microgrid cell 300 when the peak control or the grid interruption occurs, but a load (e.g., 450b or 450c) having a low priority may not be interchanged with the power when the peak control or the grid interruption occurs.

In summary, the second microgrid cell 400 may include the loads that need to be selectively driven based on characteristics or priorities when an event such as the peak control or the grid interruption occurs.

The second ESS 460 may manage a power state of the second load 450 and may perform a peak control function.

In addition, the second ESS 460 may include a PMS, a battery, a BMS, and the PCS like the first ESS 360 described above, but a detailed description thereof will be omitted.

For reference, the second microgrid cell 400 and the first microgrid cell 300 may be connected to each other through a converter 380 such that the power may be interchanged therebetween.

Specifically, the converter 380 may include an AC-DC converter 380*a* and a DC-AC converter 380*b* which are connected in series with each other.

Here, the AC-DC converter 380*a* and the DC-AC converter 380*b* are defined as names of the respective converters on the basis that the power is provided from the first microgrid cell 300 to the second microgrid cell 400. That is, on the basis that the power is provided from the second microgrid cell 400 to the first microgrid cell 300, the DC-AC converter 380*b* may become the AC-DC converter and the AC-DC converter 380*a* may become the DC-AC converter.

However, for convenience of explanation, the names of the respective converters are defined on the basis that the power is provided from the first microgrid cell 300 to the second microgrid cell 400.

Specifically, for example, when the power of the second microgrid cell 400 is insufficient due to the peak control or the grid interruption, the first microgrid cell 300 may provide an AC voltage to the AC-DC converter 380*a* and the AC-DC converter 380*a* may convert the AC voltage provided from the first microgrid cell 300 into a DC voltage to provide it to the DC-AC converter 380*b*. In addition, the DC-AC converter 380*b* may again convert the DC voltage provided from the AC-DC converter 380*a* into the AC voltage to provide it to the second microgrid cell 400.

When the power of the first microgrid cell 300 is insufficient due to the peak control or the grid interruption, the second microgrid cell 400 may provide the AC voltage to the DC-AC converter 380*b* and the DC-AC converter 380*b* may convert the AC voltage provided from the second microgrid cell 400 into the DC voltage to provide it to the AC-DC converter 380*a*. In addition, the AC-DC converter 380*a* may again convert the DC voltage provided from the DC-AC converter 380*b* into the AC voltage to provide it to the first microgrid cell 300.

Here, when the converter 380 receives surplus power from the first microgrid cell 300 and provides it to the second microgrid cell 400, the converter 380 may synchronize the surplus power (i.e., a frequency, a voltage, a phase angle, and the like) of the first microgrid cell 300 to be matched to power used in the second microgrid cell 400.

In addition, when the converter 380 receives surplus power from the second microgrid cell 400 and provides it to the first microgrid cell 300, the converter 380 may synchronize the surplus power (i.e., a frequency, a voltage, a phase angle, and the like) of the second microgrid cell 400 to be matched to power used in the first microgrid cell 300.

Such a converter 380 enables the first microgrid cell 300 and the second microgrid cell 400 to be always connected to each other to interchange the power therebetween, and particularly, serves to enable power interchange therebetween at the time of the peak control or the grid interruption.

In addition, the converter 380 may be an insulated gate bipolar transistor (IGBT) converter.

For reference, one terminal of the AC-DC converter 380*a* may be connected between the first ESS 360 and the first load 350, and the other terminal thereof may be connected to one terminal of the DC-AC converter 380*b*. In addition, one terminal of the DC-AC converter 380*b* may be connected to the other terminal of the AC-DC converter 380*a*, and the other terminal thereof may be connected between the second ESS 460 and the second load 450.

However, the positions at which the respective terminals of the AC-DC converter 380*a* and the DC-AC converter 380*b* are connected to each other are limited thereto.

In addition, in some situations, an additional converter may be installed between the AC-DC converter 380*a* and the first microgrid cell 300 or between the DC-AC converter 380*b* and the second microgrid cell 400.

That is, for example, in a case in which one terminal of the AC-DC converter 380*a* is connected to the battery 366 of the first ESS 360, a DC-DC converter (not shown) and a DC-AC converter may be additionally mounted or only a DC-AC converter (not shown) may be additionally installed between the battery 366 and the AC-DC converter 380*a*.

In this case, the DC voltage of the battery 366 may be transferred to the DC-AC converter through the DC-DC converter, and the DC-AC converter may convert the DC voltage transferred through the DC-DC converter into the AC voltage to provide it to the AC-DC converter 380*a*.

Alternatively, the DC voltage of the battery 366 may be transferred to the DC-AC converter, and the DC-AC converter may convert the transferred DC voltage into the AC voltage to provide it to the AC-DC converter 380*a*.

In addition, for example, in a case in which the other terminal of the DC-AC converter 380*b* is connected to a battery (not shown) of the second ESS 460, an AC-DC converter (not shown) and a DC-DC converter (not shown) may be additionally mounted or only an AC-DC converter may be additionally installed between the DC-AC converter 380*b* and the battery.

In this case, the AC voltage of the DC-AC converter 380*b* may be transferred to the AC-DC converter, and the AC-DC converter may convert the transferred AC voltage into the DC voltage to provide it to the battery of the second ESS 460 through the DC-DC converter.

Alternatively, the AC voltage of the DC-AC converter 380*b* may be transferred to the AC-DC converter, and the AC-DC converter may convert the transferred AC voltage into the DC voltage to provide it to the battery of the second ESS 460.

The third microgrid cell 500 may include a third load 550.

Specifically, the third microgrid cell 500 may include a third sensor 520 and a third load 550.

For reference, unlike the second microgrid cell 400, the third microgrid cell 500 may not include the EMS, the ESS, or the distributed power system. Accordingly, a power supply state of the third microgrid cell 500 may be transferred to the middleware server 200 through the cloud server 600.

Of course, the third sensor 520 of the third microgrid cell 500 may directly transmit the power state of the third load 550 to the middleware server 200 by communicating with the middleware server 200.

The third sensor 520 may sense the power state of the third load 550.

Specifically, the third sensor 520 may be, for example, an IoT sensor having a communication function, and may sense the power state (e.g., whether or not power is insufficient, whether or not power is excessive, and the like) of the third load 550 to provide the sensed information to the cloud server 600.

The third load 550 may include, for example, a home, a large building, a factory, and the like.

Specifically, the third load 550 may be connected to the third sensor 520.

For reference, the third load 550 may be a general load which is not connected to the distributed power system, and an object thereof may be to provide an analysis based energy reduction service (it is possible to confirm the power state of the third load 550 in real time through the mobile terminal 800 that a user may communicate with the cloud server 600 by transmitting power state information of the third load 550 to the cloud server 600) through the third sensor 520.

Hereinafter, one example of an independent driving method of the first microgrid cell of FIG. 3 at the time of a grid interruption will be described with reference to FIGS. 4 to 11.

FIGS. 4 to 11 are diagrams schematically illustrating one example of an independent driving method of the first microgrid cell of FIG. 3 at the time of a grid interruption.

For reference, for convenience of explanation, a description will be made by adding some components which are not illustrated in FIG. 3 to the first microgrid cell 300 of FIGS. 4 to 11, or omitting some components which are illustrated in FIG. 3 from the first microgrid cell 300 of FIGS. 4 to 11.

First, referring to FIGS. 3 to 6, when a grid G is interrupted, a static transfer switch (STS) 324 may sense the interruption of the grid G to block a connection with the grid G, and the first ESS 360 may change a driving mode from a constant power mode to a constant voltage constant frequency (CVCF) mode to independently supply the power to the first load 350.

Specifically, the STS 324 may open and close a connection between the grid G and the first ESS 360 and a connection between the grid G and the first load 350.

In addition, when the grid G is interrupted, the STS 324 may sense the interruption of the grid G within a time of 4 ms to block the connection with the grid G.

In addition, when the grid G is interrupted, the first ESS 360 may change the driving mode to the CVCF mode within 10 ms and may then stably supply the power to the first load 350 (i.e., the first ESS 360 may perform an interruptible independent driving).

In this case, a breaker 321 installed on the grid G side may also block the connection with the grid G.

Figure 7:
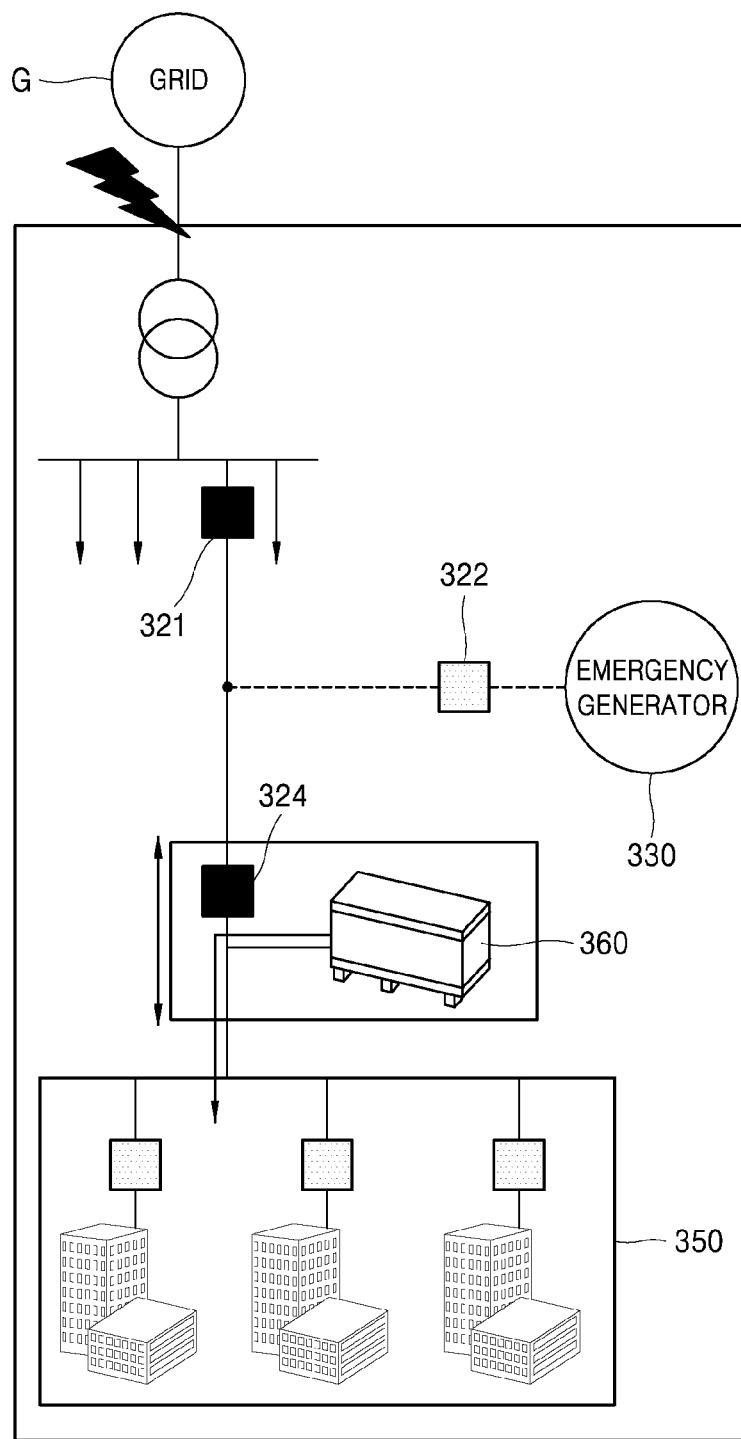
Figure 8:
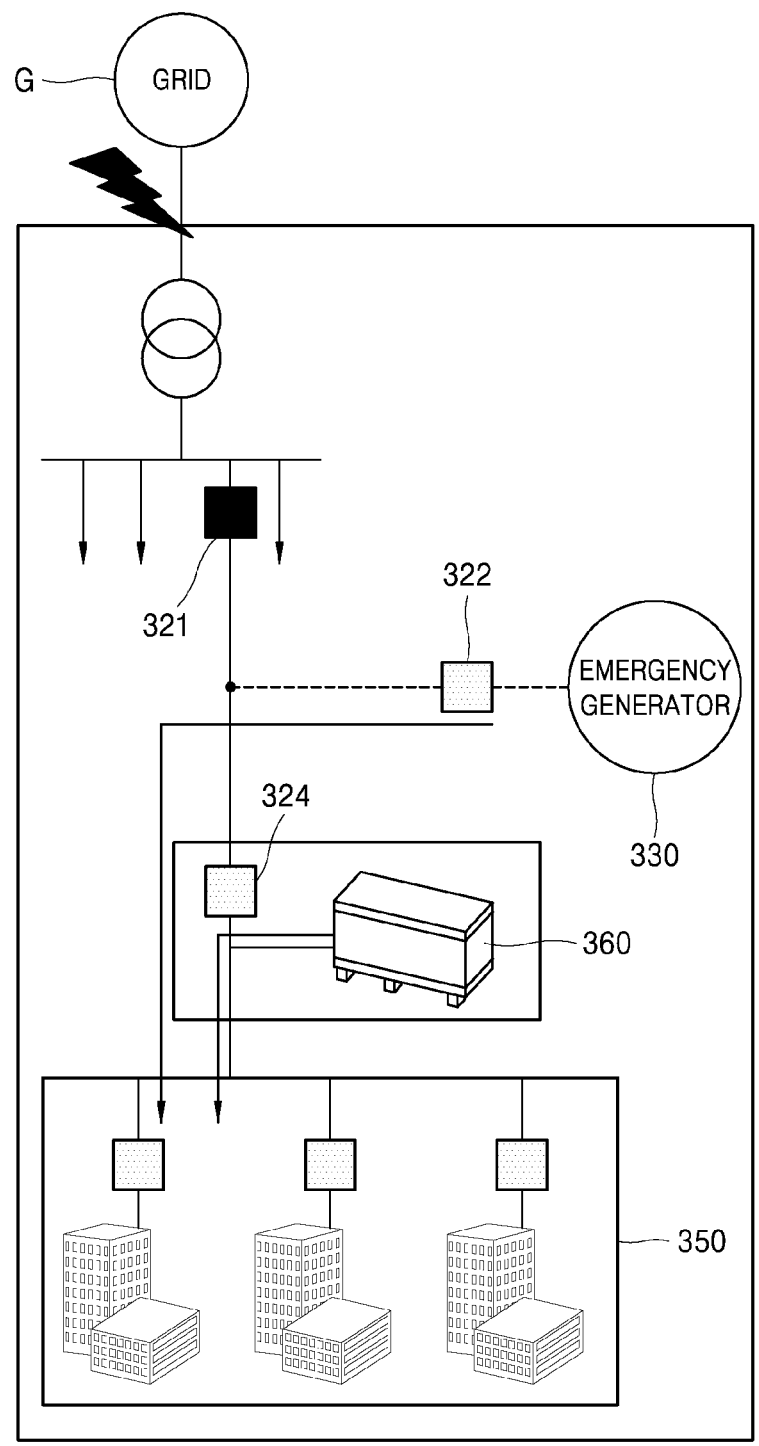
Figure 9:
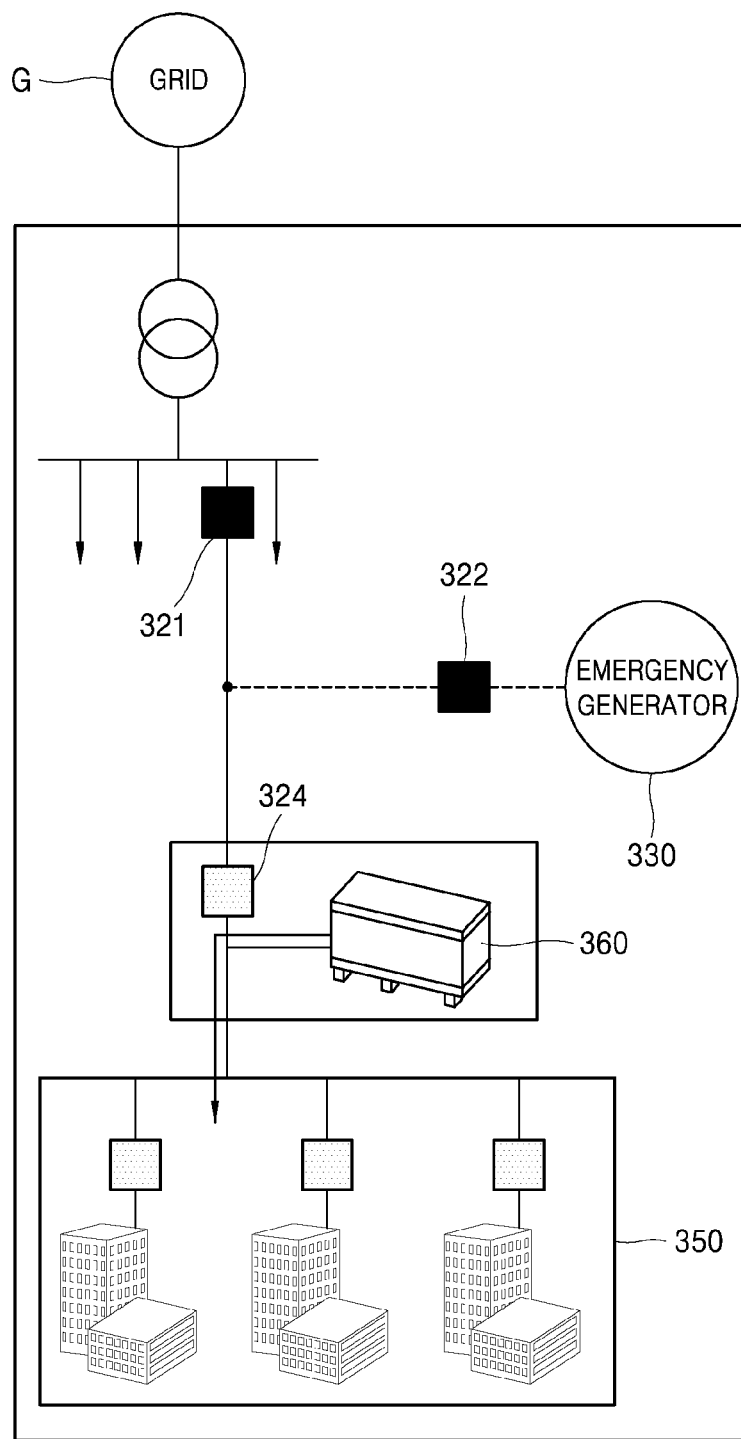
Figure 10:
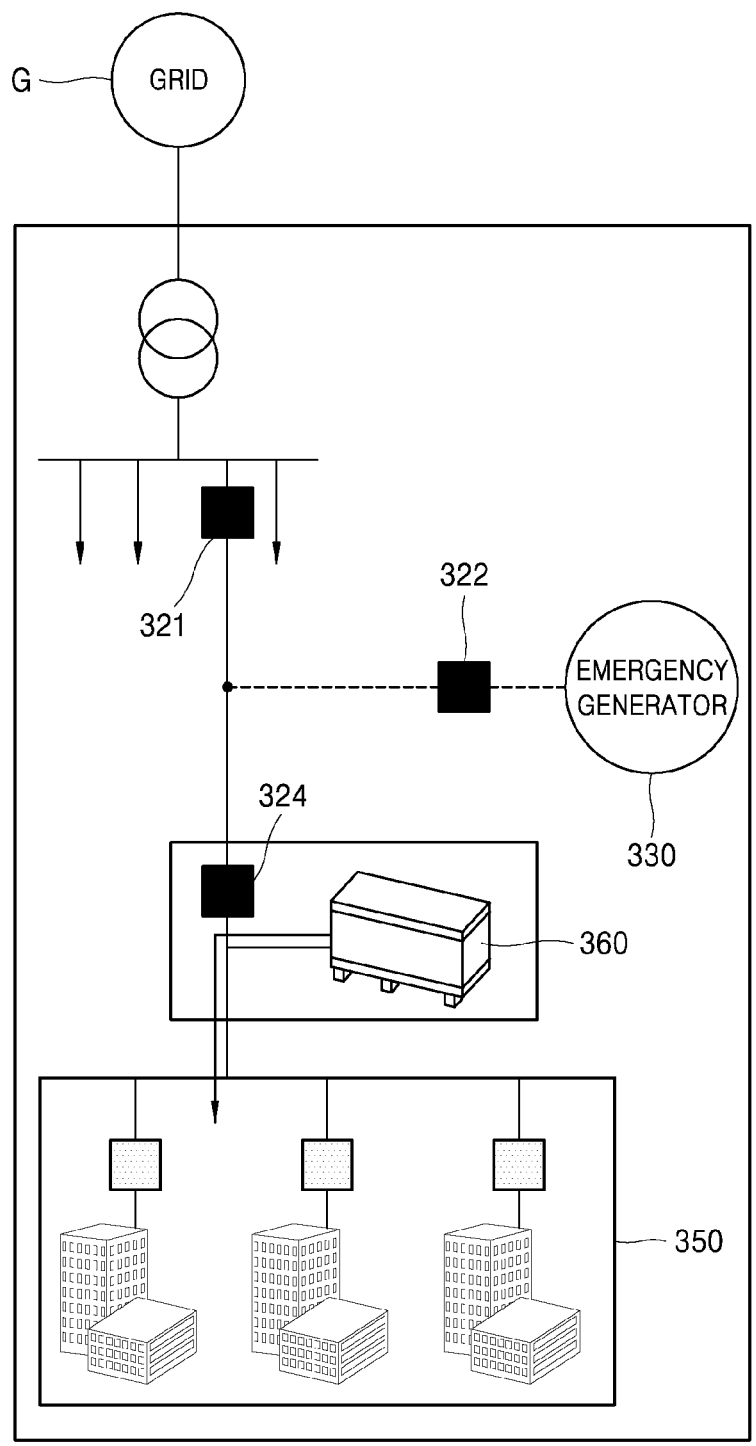
Figure 11:
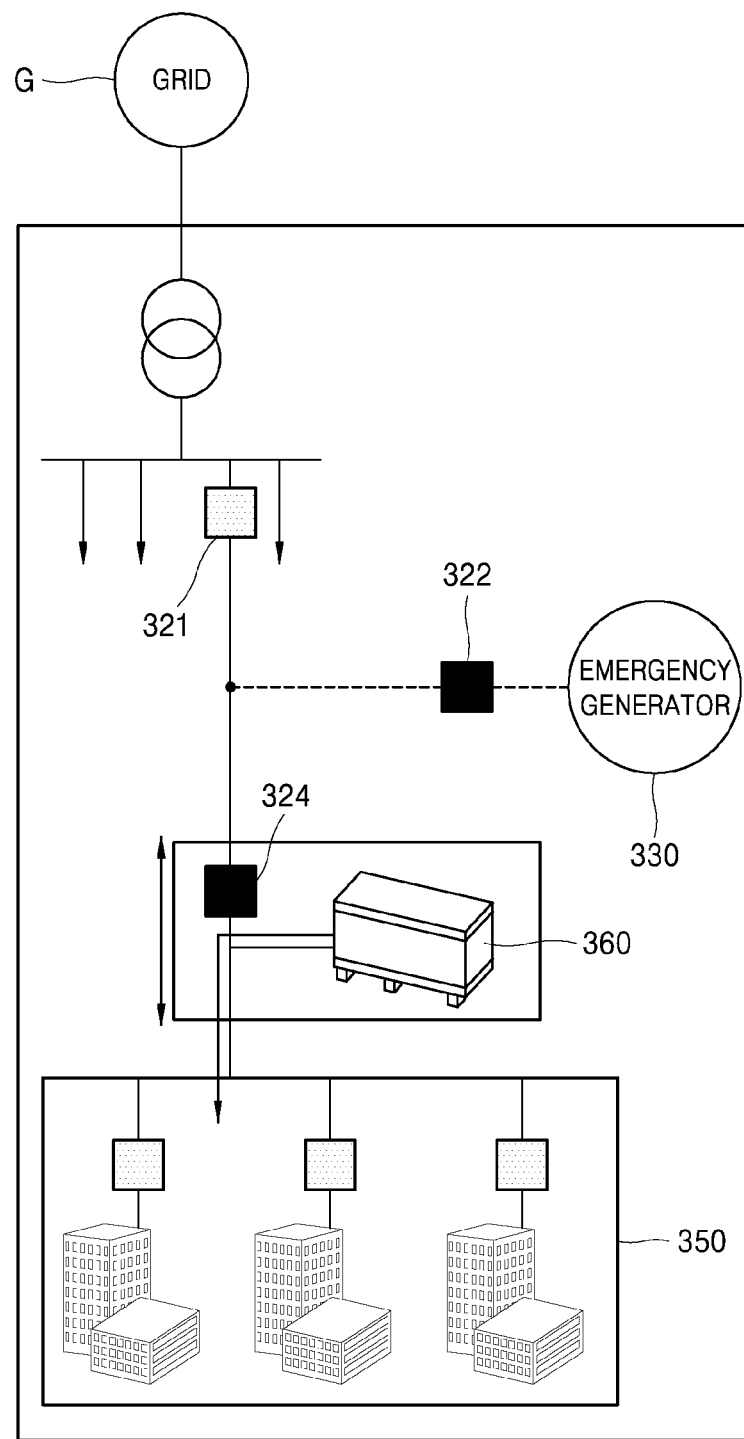
Figure 12:
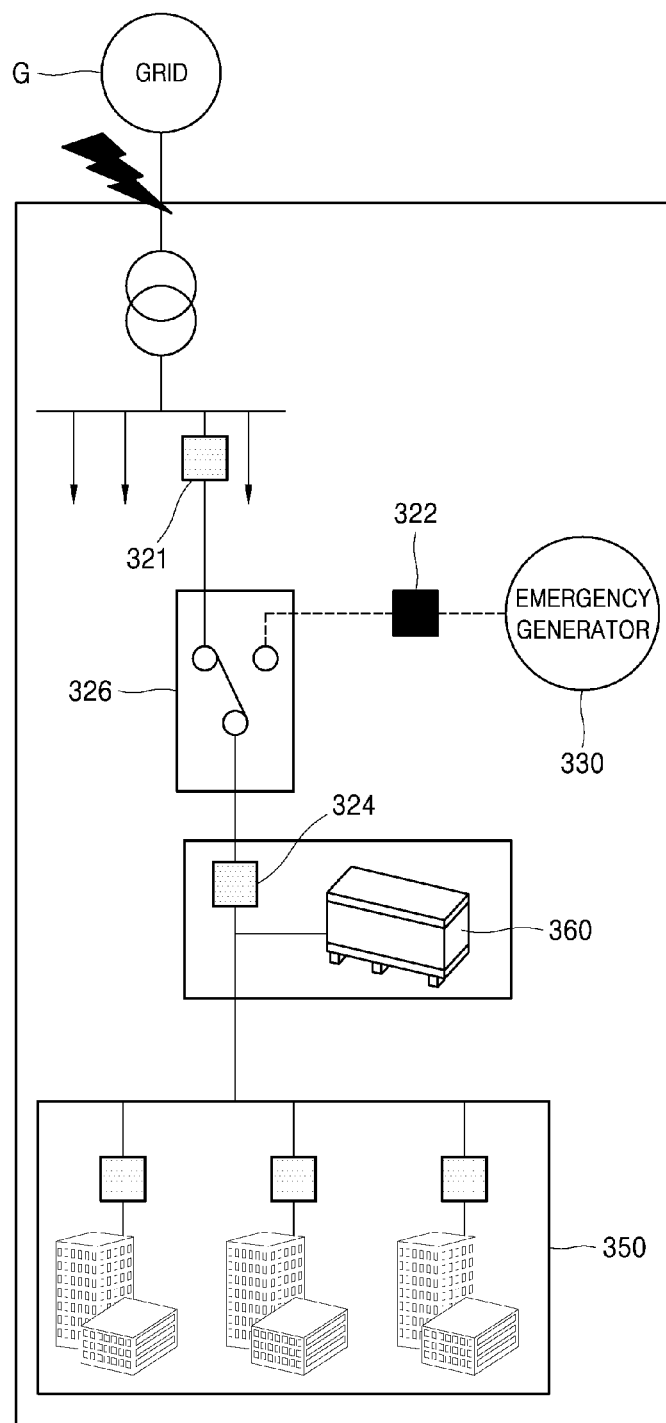
FIGS. 12 to 21 are diagrams schematically illustrating another example of an independent driving method of the first microgrid cell of FIG. 3 at the time of a grid interruption.
Figure 13:
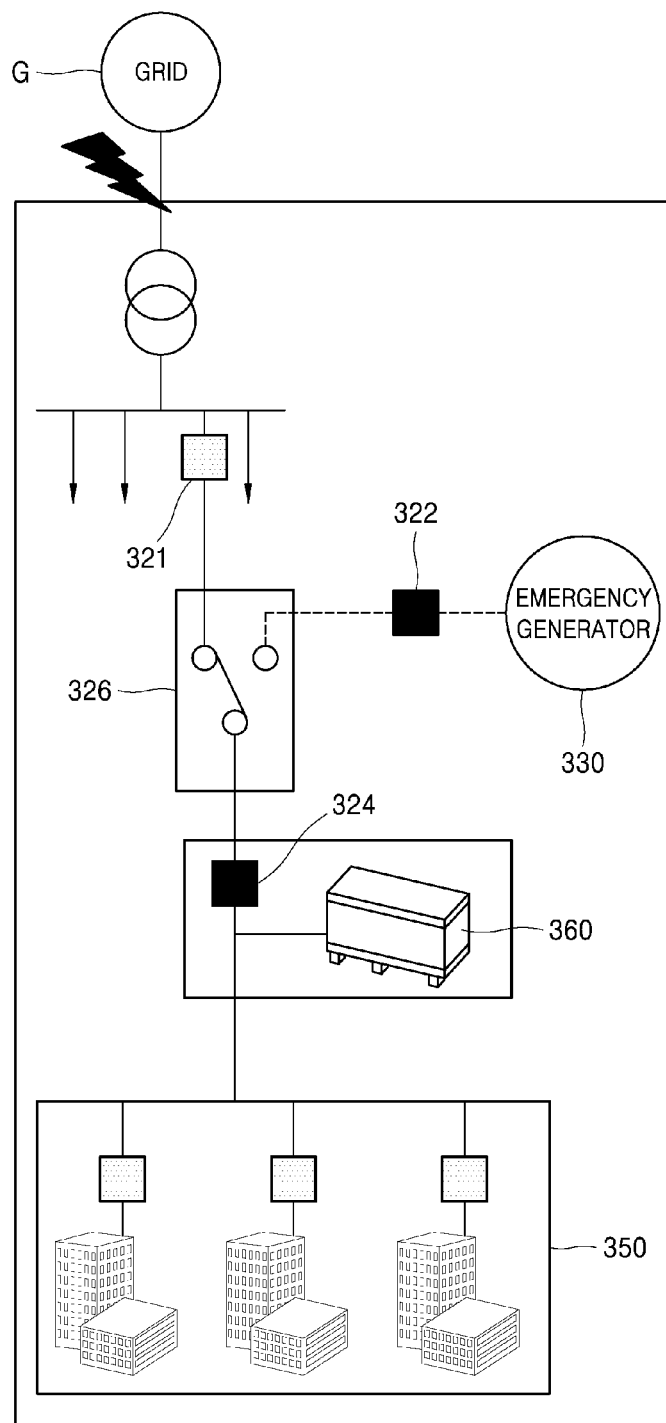
Figure 14:
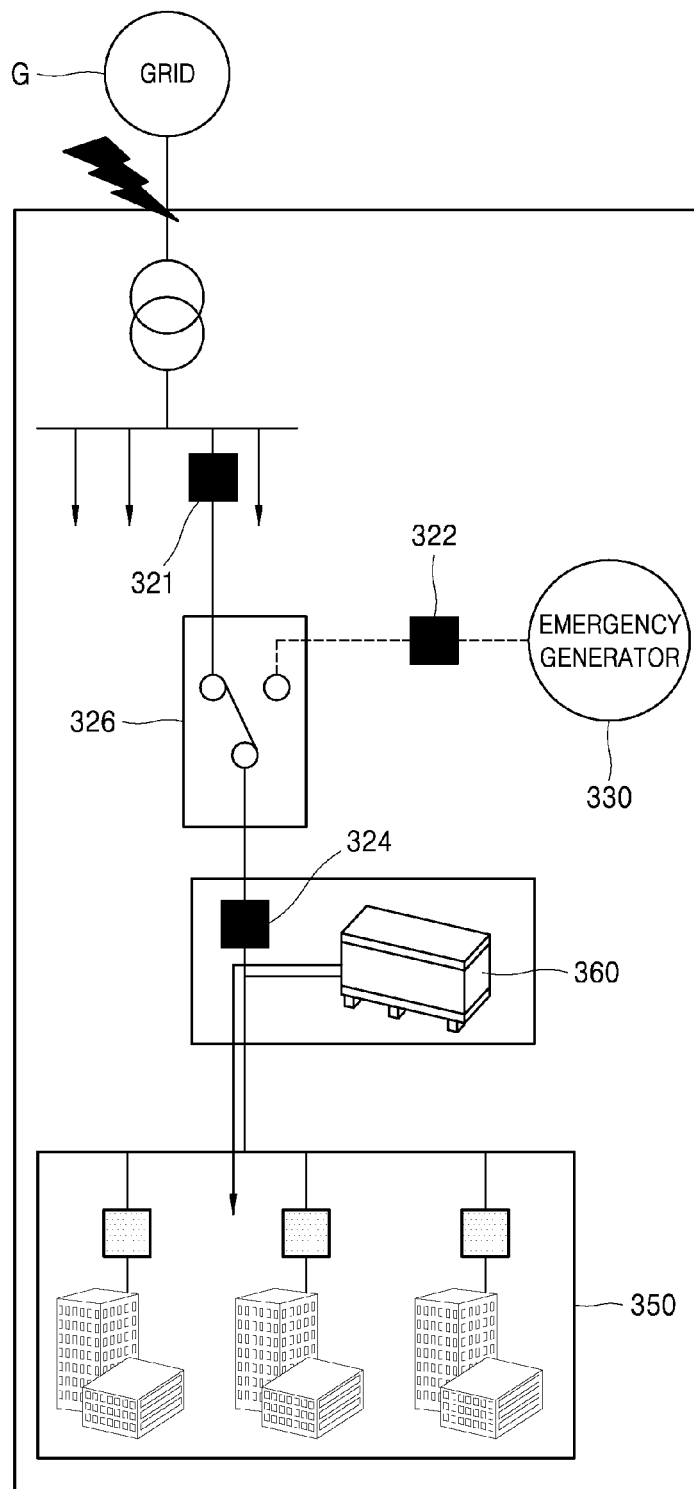
Figure 15:
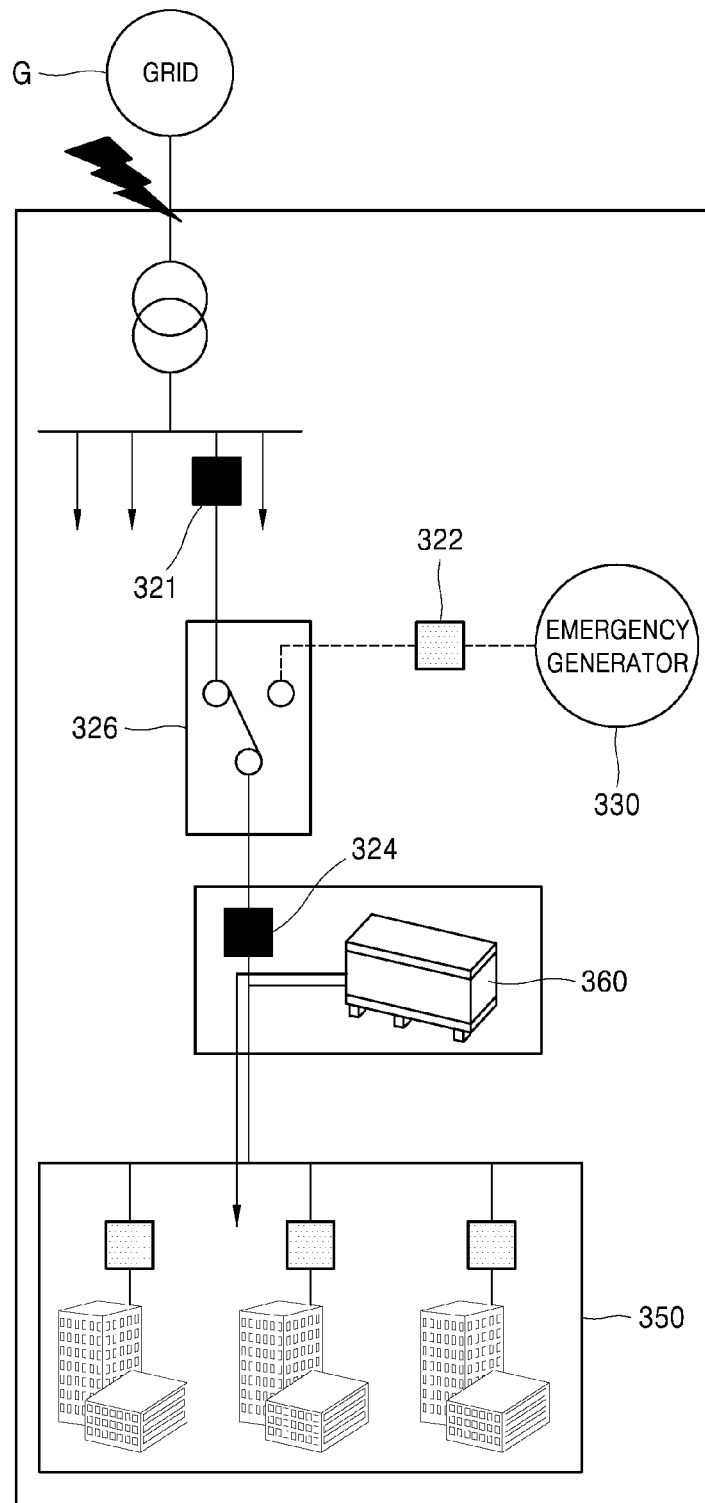
Figure 16:
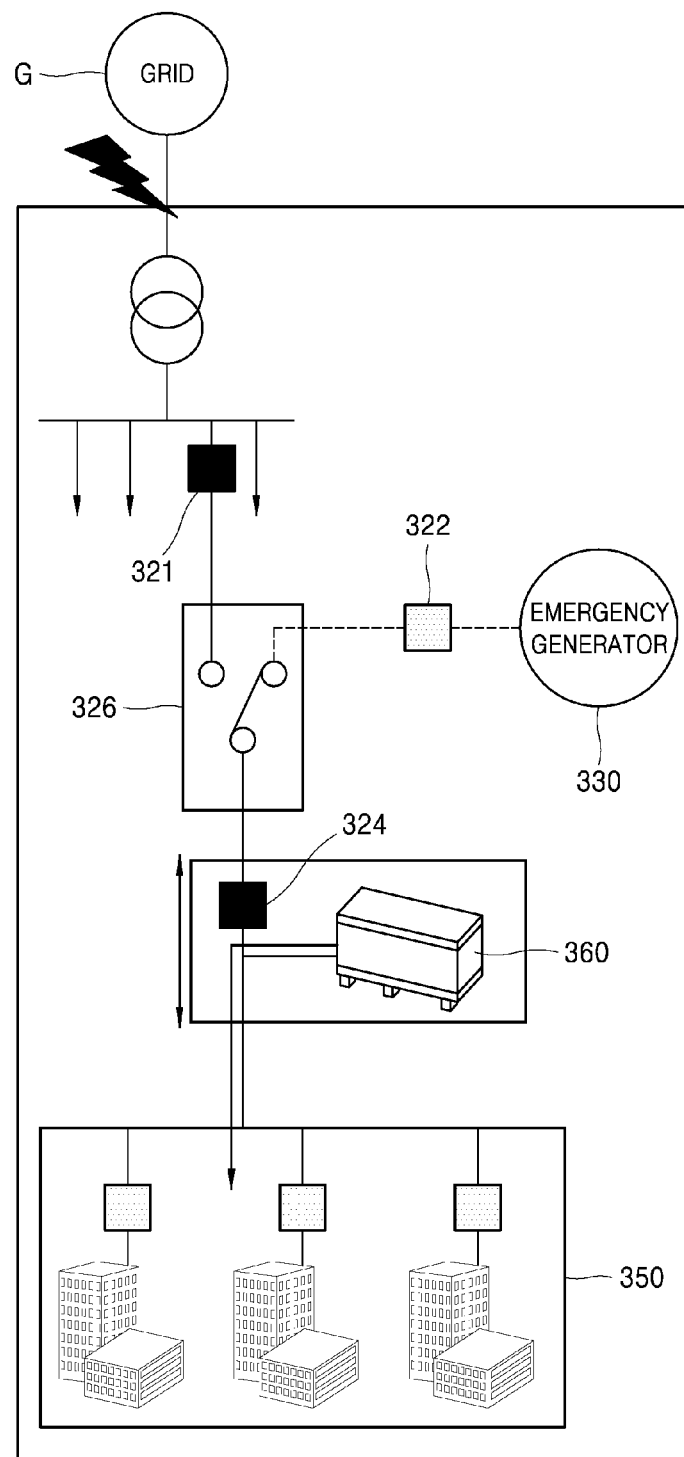
Figure 17:
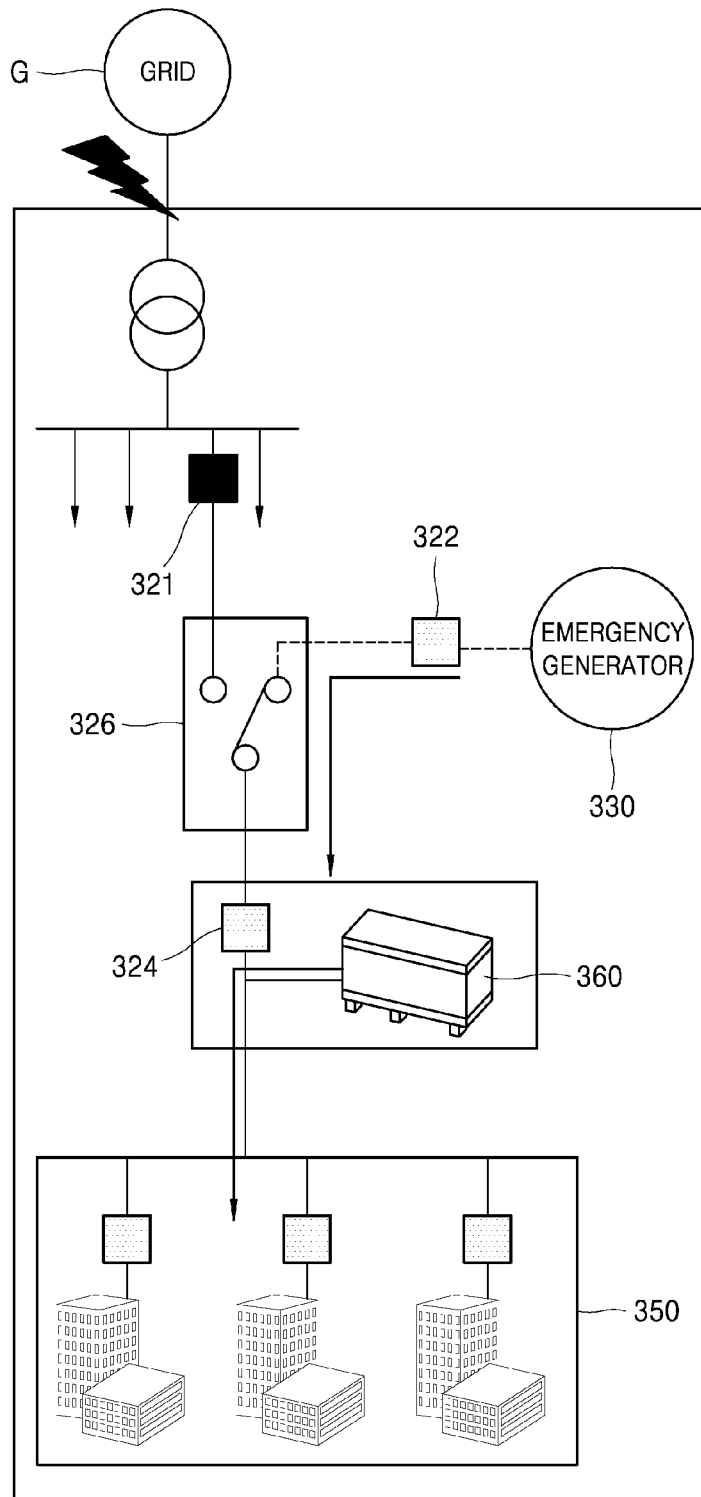

Next, referring to FIGS. 3, 7, and 8, when the first ESS changes the driving mode to the CVCF mode to independently supply the power to the first load 350, the first EMS 310 may drive the emergency generator 330, and the emergency generator 330 driven by the first EMS 310 may supply the power to the first load 350 side.

In this case, a breaker 322 installed on the emergency generator 330 side may activate a connection with the emergency generator 330, but a connection between the emergency generator 330 and the first load 350 may be blocked by the STS 324. Accordingly, the emergency generator 330 performs a no-load driving.

When the power supplied by the emergency generator 330 is sensed, the STS 324 may provide a first alarm to the first ESS 360, and when the first ESS 360 receives the first alarm from the STS 324, the first ESS 360 may perform a first synchronization algorithm.

For reference, the first synchronization algorithm may be an algorithm for synchronizing a frequency, a voltage, and a phase angle of the first ESS 360 with a frequency, a voltage, and a phase angle of the emergency generator 330.

When the first synchronization algorithm of the first ESS 360 is performed, the STS 324 may release the disconnection with the grid G, the emergency generator 330 may be driven in a frequency following mode, and the first ESS 360 may be changed back to the constant power mode and driven.

Accordingly, the first load 350 may be stably supplied with the power from the emergency generator 330 and the first ESS 360 until the grid G is restored.

Next, referring to FIGS. 3, and 9 to 11, when the grid G is restored, the first EMS 310 may stop the driving of the emergency generator 330.

In this case, the breaker 322 installed on the emergency generator 330 side blocks the connection with the emergency generator 330.

The STS 324 may sense the stop of the driving of the emergency generator 330 to provide a second alarm to the first ESS 360 and to again block the connection with the grid G.

When the first ESS 360 receives the second alarm from the STS 324, the first ESS 360 may change the driving mode from the constant power mode to the CVCF mode to independently supply the power to the first load 350.

When the breaker 321 installed on the grid G side is again activated and the power is supplied to the first load 350 side from the grid G, the STS 324 may sense the power supplied by the grid G to provide a third alarm to the first ESS 360.

When the first ESS 360 receives the third alarm from the STS 324, the first ESS 360 may perform a second synchronization algorithm, and when the first ESS 360 performs the second synchronization algorithm, the STS 324 may again release the disconnection with the grid G.

Here, the second synchronization algorithm may be an algorithm for synchronizing a frequency, a voltage, and a phase angle of the first ESS 360 with a frequency, a voltage, and a phase angle of the grid G.

In addition, the first microgrid cell may be again normally returned to a state before the interruption of the grid G by again releasing, by the STS 324, the disconnection with the grid G.

According to the process described above, when the grid G is interrupted, the first microgrid cell 300 according to the present disclosure may be independently driven.

In addition, the independent driving of the first microgrid cell 300 described above implements an interruptible independent driving with a small capacity battery (the battery 366 in the first ESS 360), thereby making it possible to reduce the cost and to enable a long time (e.g., four hours or more) independent driving through a parallel driving of the emergency generator 330 and the first ESS 366.

Hereinafter, another example of an independent driving method of the first microgrid cell of FIG. 3 at the time of a grid interruption will be described with reference to FIGS. 12 to 21.

FIGS. 12 to 21 are diagrams schematically illustrating another example of an independent driving method of the first microgrid cell of FIG. 3 at the time of a grid interruption.

For reference, for convenience of explanation, a description will be made by adding some components which are not illustrated in FIG. 3 to the first microgrid cell 300 of FIGS. 12 to 21, or omitting some components which are illustrated in FIG. 3 from the first microgrid cell 300 of FIGS. 12 to 21.

First, referring to FIGS. 3, and 12 to 14, when a grid G is interrupted, a static transfer switch (STS) 324 may sense the interruption of the grid G to block a connection with the grid G, and the first ESS 360 may change a driving mode from a constant power mode to a constant voltage constant frequency (CVCF) mode to independently supply the power to the first load 350.

Specifically, the STS 324 may open and close a connection between the grid G and the first ESS 360 and a connection between the grid G and the first load 350.

In addition, when the grid G is interrupted, the STS 324 may sense the interruption of the grid G within a time of 4 ms to block the connection with the grid G.

In addition, when the grid G is interrupted, the first ESS 360 may change the driving mode to the CVCF mode within 10 ms and may then stably supply the power to the first load 350 (i.e., the first ESS 360 may perform an interruptible independent driving).

In this case, a breaker 321 installed on the grid G side may also block the connection with the grid G.

Next, referring to FIGS. 3 and 15 to 17, when first ESS 360 is changed to the CVCF mode to independently supply the power to the first load 350, the first EMS 310 may drive the emergency generator 330.

In addition, when the emergency generator 330 is driven, a closed transition transfer switch (CTTS) 326 may connect the emergency generator 330 with the STS 324 while blocking the connection between the emergency generator 330 and the grid G, and the emergency generator 330 may supply the power to the first load 350 side.

Specifically, the CTTS 326 may open and close a connection between the grid G and the STS 324 and a connection between the grid G and the emergency generator 330. That is, the CTTS 326 enables a switchover work from the grid to the emergency generator 330 or a switchover work from the emergency generator 330 to the grid G in an uninterrupted manner.

In this case, a breaker 322 installed on the emergency generator 330 side may activate a connection with the emergency generator 330, but a connection between the emergency generator 330 and the first load 350 may be blocked by the STS 324. Accordingly, the emergency generator 330 performs a no-load driving.

When the power supplied by the emergency generator 330 is sensed, the STS 324 may provide a first alarm to the first ESS 360, and when the first ESS 360 receives the first alarm from the STS 324, the first ESS 360 may perform a first synchronization algorithm.

For reference, the first synchronization algorithm may be an algorithm for synchronizing a frequency, a voltage, and a phase angle of the first ESS 360 with a frequency, a voltage, and a phase angle of the emergency generator 330.

When the first synchronization algorithm of the first ESS 360 is performed, the STS 324 may release the disconnection with the grid G, the emergency generator 330 may be driven in a frequency following mode, and the first ESS 360 may be changed back to the constant power mode and driven.

Accordingly, the first load 350 may be stably supplied with the power from the emergency generator 330 and the first ESS 360 until the grid G is restored.

Figure 18:
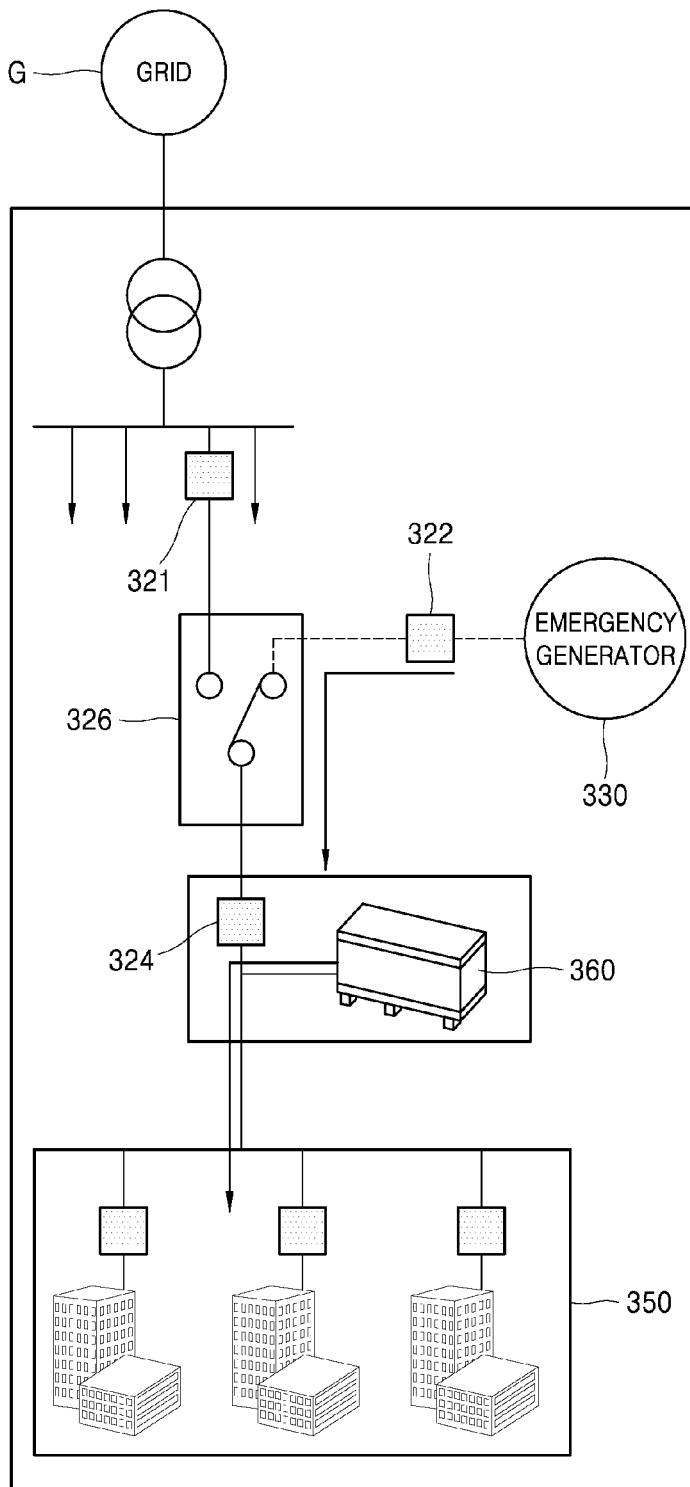
Figure 19:
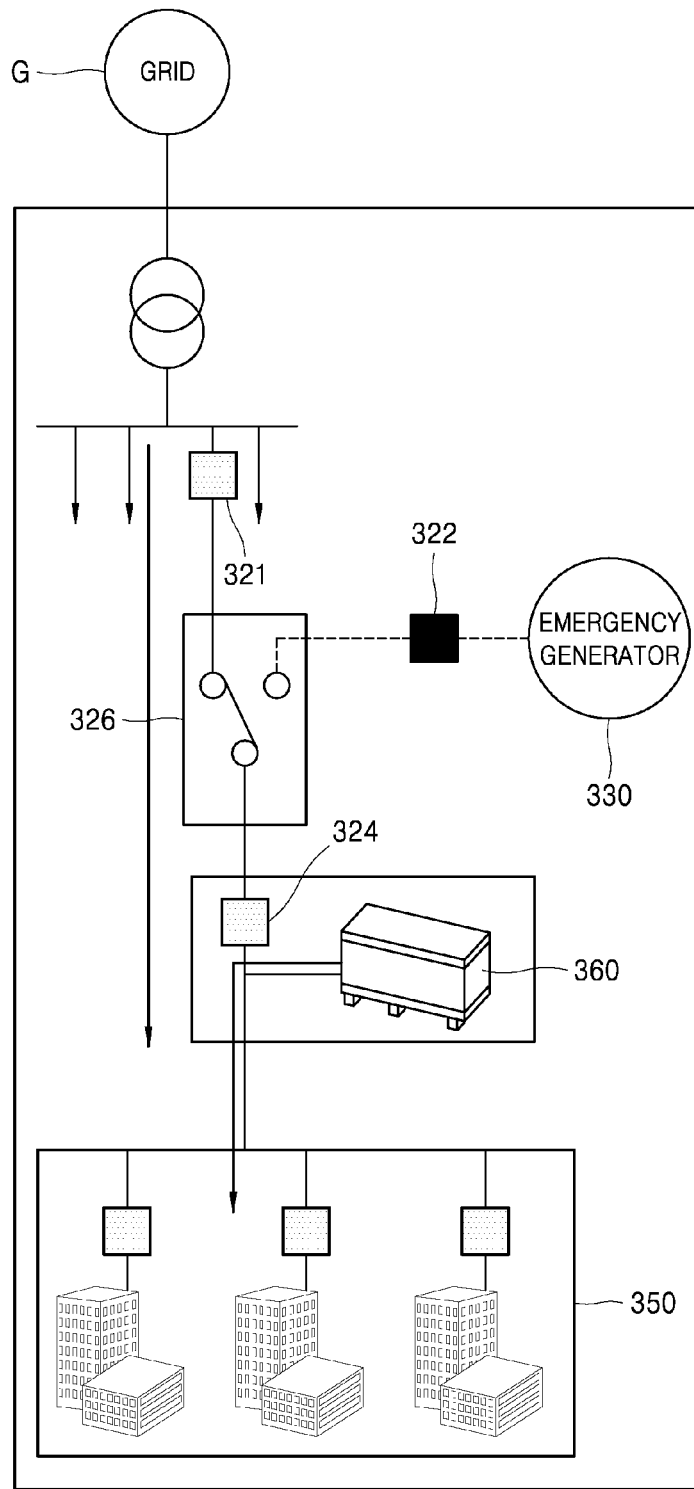
Figure 20:
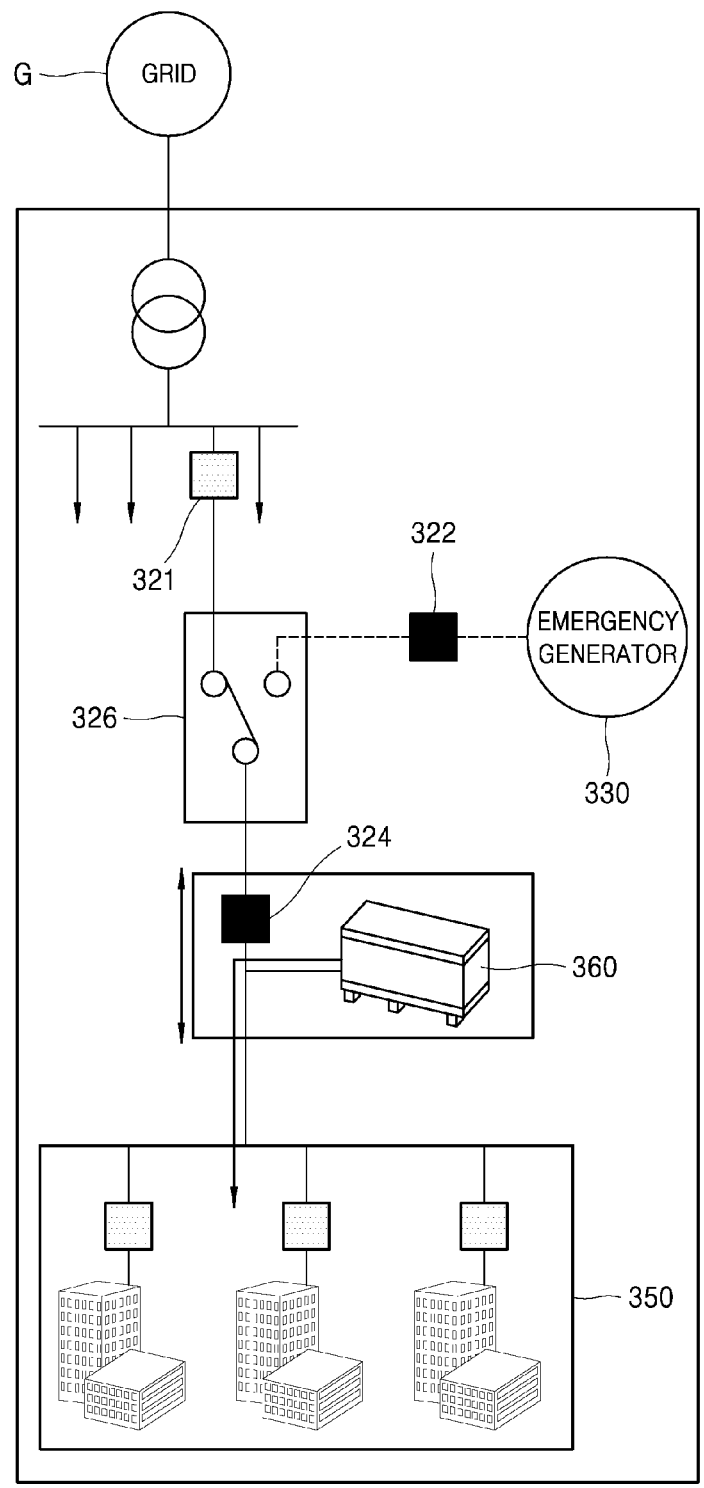
Figure 21:
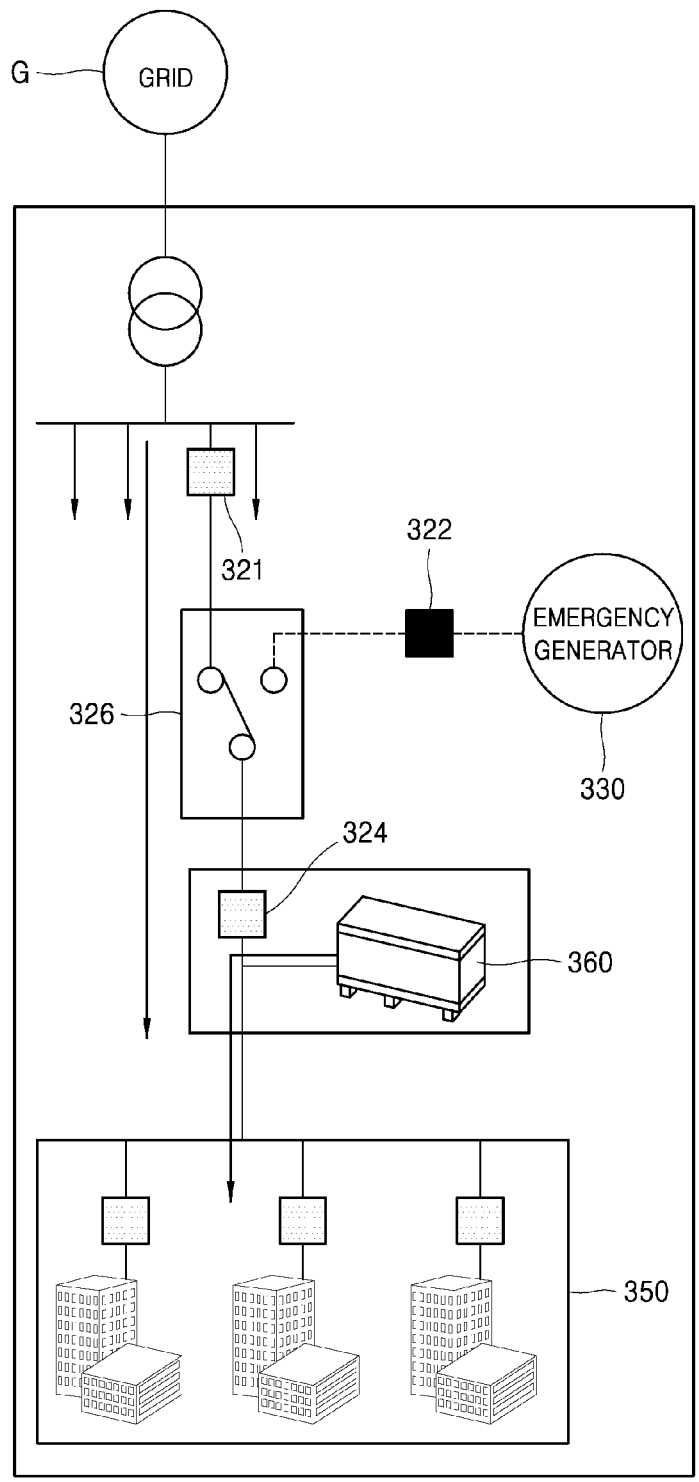

Next, referring to FIGS. 3, 18, and 19, when the grid G is restored, the breaker 321 installed on the grid G side may be activated.

In addition, when the grid G is restored, the first EMS 310 may stop the driving of the emergency generator 330, and the CTTS 326 may sense the stop of the driving of the emergency generator 330 to connect the STS 324 and the grid G with each other while blocking the connection between the emergency generator 330 and the STS 324.

In this case, the breaker 322 installed on the emergency generator 330 side blocks the connection with the emergency generator 330.

When the STS 324 is connected to the grid G, the CTTS 326 may synchronize the power provided from the grid G with the power of the first ESS 360 by performing a synchronization algorithm for CTTS.

Here, the synchronization algorithm for CTTS may be an algorithm for synchronizing a frequency, a voltage, and a phase angle of the first ESS 360 with a frequency, a voltage, and a phase angle of the grid.

In addition, as the STS 324 is connected to the grid G and the power provided from the grid G and the power of the first ESS are synchronized with each other, the first microgrid cell may be again returned to a state before the interruption of the grid G.

On the other hand, referring to FIGS. 3, 18, 20, and 21, the first microgrid cell may be re-connected to the grid G through processes different from those of FIGS. 18 and 19.

Specifically, when the grid G is restored, the breaker 321 installed on the grid G side may be activated.

In addition, the first EMS 310 may stop the driving of the emergency generator 330 and the STS 324 may sense the stop of the driving of the emergency generator 330 to provide a second alarm to the first ESS 360 and to again block the connection with the grid G.

Here, when the driving of the emergency generator 330 is stopped, the breaker 322 installed on the emergency generator 330 side blocks the connection with the emergency generator 330.

When the first ESS 360 receives the second alarm from the STS 324, the first ESS 360 may change the driving mode from the constant power mode to the CVCF mode to independently supply the power to the first load 350.

Here, when the first ESS is changed to the CVCF mode, the CTTS 326 may connect the STS 324 and the grid G with each other while blocking the connection between the emergency generator 330 and the STS 324.

When the power is supplied to the first load 350 side from the grid G, the STS 324 may sense the power supplied by the grid G to provide a third alarm to the first ESS 360, and when the first ESS 360 receives the third alarm from the STS 324, the first ESS 360 may perform a second synchronization algorithm.

When the first ESS 360 performs the second synchronization algorithm, the STS 324 may again release the disconnection with the grid G, and the disconnection with the grid G is again released, the first ESS 360 may be again changed to the constant power mode from the CVCF mode.

For reference, the second synchronization algorithm may be an algorithm for synchronizing a frequency, a voltage, and a phase angle of the first ESS 360 with a frequency, a voltage, and a phase angle of the grid G.

In addition, the first microgrid cell may be again normally returned to a state before the interruption of the grid G by again releasing, by the STS 324, the disconnection with the grid G.

Hereinafter, a power interchange method of the hierarchical type power control system of FIG. 1 will be described with reference to FIG. 22.

Figure 22:
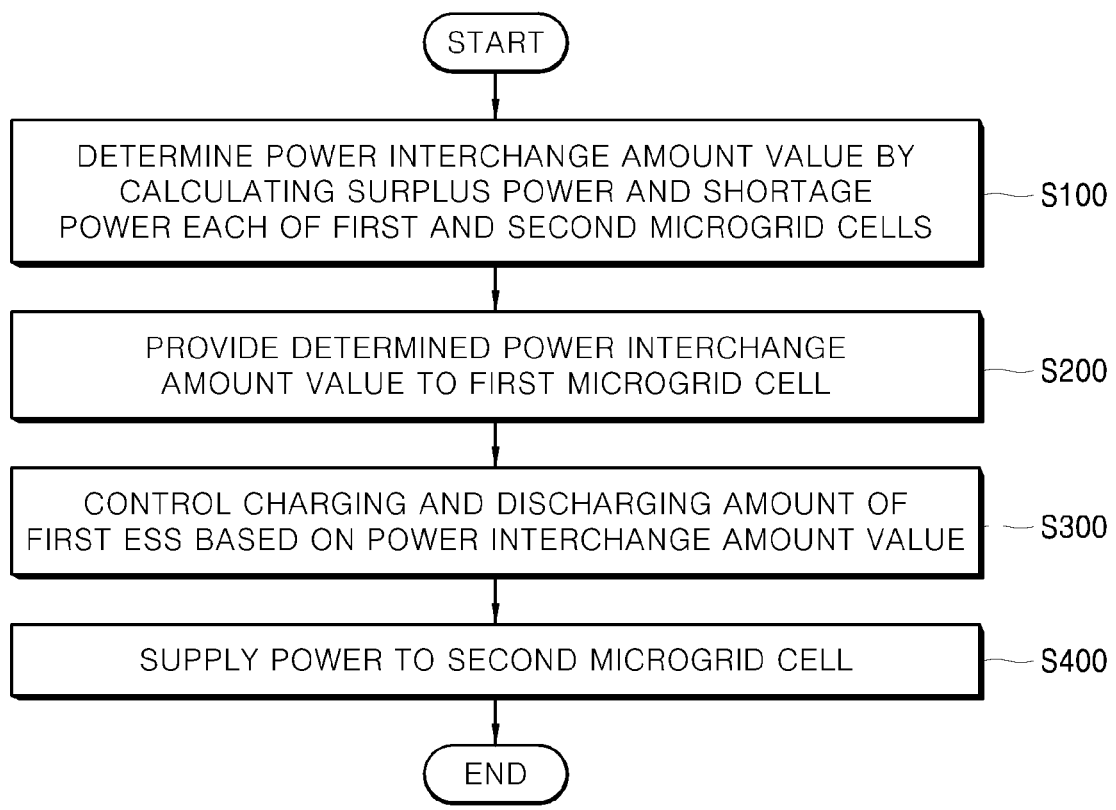
FIG. 22 is a flowchart illustrating a power interchange method of the hierarchical type power control system of FIG. 1.

FIG. 22 is a flowchart illustrating a power interchange method of the hierarchical type power control system of FIG. 1.

Referring to FIGS. 1 to 3 and 22, first, a power interchange amount value is determined by calculating surplus power and shortage power of each of the first microgrid cell and the second microgrid cell (S100).

Specifically, when the grid is interrupted, prior to calculating the surplus power and the shortage power of each of the first microgrid cell 300 and the second microgrid cell 400, the following process may be preferentially performed.

First, it may be sensed whether or not the grid is interrupted. In this case, whether or not the grid is interrupted may be sensed by the integrated control system 100 such that a fact that the grid is interrupted may be informed to the first to third microgrid cells 300, 400, and 500 through the middleware server 200, and may also be directly sensed by each of the first to third microgrid cells 300, 400, and 500.

When the fact that the grid is interrupted is sensed, an independent driving of the first microgrid cell 300 may be initiated.

Specifically, the first microgrid cell 300 may perform an uninterruptible independent driving through the method described above. That is, the power may be supplied to the first load 350 in an uninterrupted manner through a connection driving between the first ESS 360 and the emergency generator 330 in the first microgrid cell 300.

Of course, when the first microgrid cell 300 does not include the emergency generator 330, the first ESS 360 having the UPS structure may be driven in an independent driving mode to supply the power to the first load 350 in the uninterrupted manner.

As described above, when the independent driving of the first microgrid cell 300 is initiated, the power interchange amount value may be determined by calculating the surplus power and the shortage power of each of the first microgrid cell 300 and the second microgrid cell 400.

When the grid is in a normal state, not when the grid is interrupted, typically, at the time of peak control, the power interchange amount value may be determined by calculating the surplus power and the shortage power of each of the first microgrid cell 300 and the second microgrid cell 400 without sensing whether or not the grid is interrupted and performing the independent driving process of the first microgrid cell.

Specifically, the first microgrid cell 300 and the second microgrid cell 400 may provide information on the surplus power and the shortage power thereof to the integrated control system 100 through the middleware server 200.

When the integrated control system 100 receives the information on the surplus power and the shortage power of each of the first microgrid cell 300 and the second microgrid cell 400 through the middleware server 200, the integrated control system 100 may determine the power interchange amount value by calculating the received surplus power and shortage power.

Here, the power interchange amount value may refer to a power amount value that a microgrid cell having surplus power may interchange (provide) to a microgrid cell having shortage power.

For reference, for convenience of explanation, the description will be hereinafter provided under assumption that the second microgrid cell 400 has shortage power and the first microgrid cell 300 has surplus power.

Of course, since the respective steps of the power interchange method to be described below may be equally applied to a state in which the first microgrid cell 300 has the shortage power and the second microgrid cell 400 has the surplus power, a description thereof will be omitted.

However, at the time of the grid interruption not the peak control, since the first microgrid cell 300 may perform the uninterruptible independent driving for a certain time, there is a high possibility that the first microgrid cell 300 has more surplus power than the second microgrid cell 400.

If the power interchange amount value is determined (S100), the integrated control system 100 provides the determined power interchange amount value to the first microgrid cell 300 (S200).

Specifically, the integrated control system 100 may provide the power interchange amount value to the microgrid cell having the surplus power among the first microgrid cell 300 and the second microgrid cell 400 through the middleware server 200.

As described above, if it is assumed that the first microgrid cell 300 has the surplus power and the second microgrid cell 400 has the shortage power, the integrated control system 100 may provide the power interchange amount value to the first microgrid cell 300 having the surplus power through the middleware server 200.

If the power interchange amount value is provided to the first microgrid cell (S200), a charging and discharging amount of the battery 366 of the first ESS 360 is controlled based on the power interchange amount value (S300).

Specifically, the first EMS 310 may receive the determined power interchange amount value from the middleware server 200 and may transfer the received determined power interchange amount value to the first ESS 360.

The first ESS 360 may control the charging and discharging amount (i.e., one or more of a charging amount and a discharging amount) of the battery 366 based on the transferred power interchange amount value.

If the charging and discharging amount of the battery 366 in the first microgrid cell 300 is controlled (S300), the power is supplied to the second microgrid cell 400 (S400).

Specifically, the first ESS 360 may control the charging and discharging amount of the battery 366 based on the received power interchange amount value and may then supply the power to the second microgrid cell 400 through the converter 380.

In addition, when the integrated control system 100 determines, for example, the power interchange amount value, the integrated control system 100 may determine the power interchange amount value based on a surplus power amount of the first microgrid cell 300 and a shortage power amount that required by the load having the high priority among the second loads 450 in the second microgrid cell 400.

Therefore, the first ESS 360 may control the charging and discharging amount of the battery 366 based on the received power interchange amount value and may then supply the power to the load having the high priority among the second loads 450 through the converter 380.

Specifically, if the first ESS 360 supplies the power to the second microgrid cell 400, the second ESS 460 of the second microgrid cell 400 may supply the power to the load having the high priority among the second loads 450 based on the power provided from the first ESS 360.

Of course, the power supplied to the second microgrid cell 400 by the first ESS 360 may also be supplied to the load having the high priority without going through the second ESS 460.

As described above, according to an exemplary embodiment of the present disclosure, the integrated control system that integrally controls the power supply states of the first to third microgrid cells (300, 400, and 500) efficiently performs the power interchange between the microgrid cells at the time of the grid interruption, thereby making it possible to solve to the power supply problem.

Hereinafter, a hierarchical type power control system according to another exemplary embodiment of the present disclosure will be described with reference to FIGS. 23 and 24.

Figure 23:
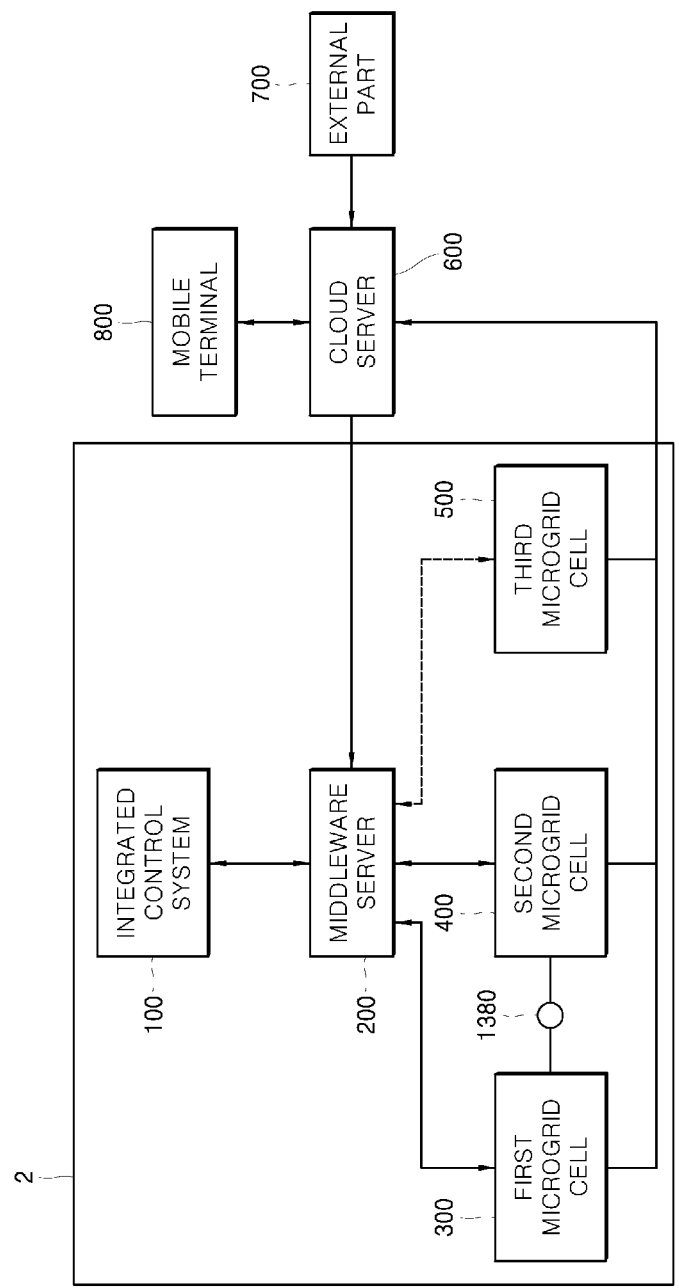
FIG. 23 is a diagram schematically illustrating a hierarchical type power control system according to another exemplary embodiment of the present disclosure.

FIG. 23 is a diagram schematically illustrating a hierarchical type power control system according to another exemplary embodiment of the present disclosure. FIG. 24 is a diagram schematically illustrating first to third microgrid cells of FIG. 23.

For reference, since a hierarchical type power control system 2 according to another exemplary embodiment of the present disclosure is the same as the hierarchical type power control system 1 according to an exemplary embodiment of the present disclosure except for some configuration, a description will be provided based on a difference therebetween.

Figure 24:
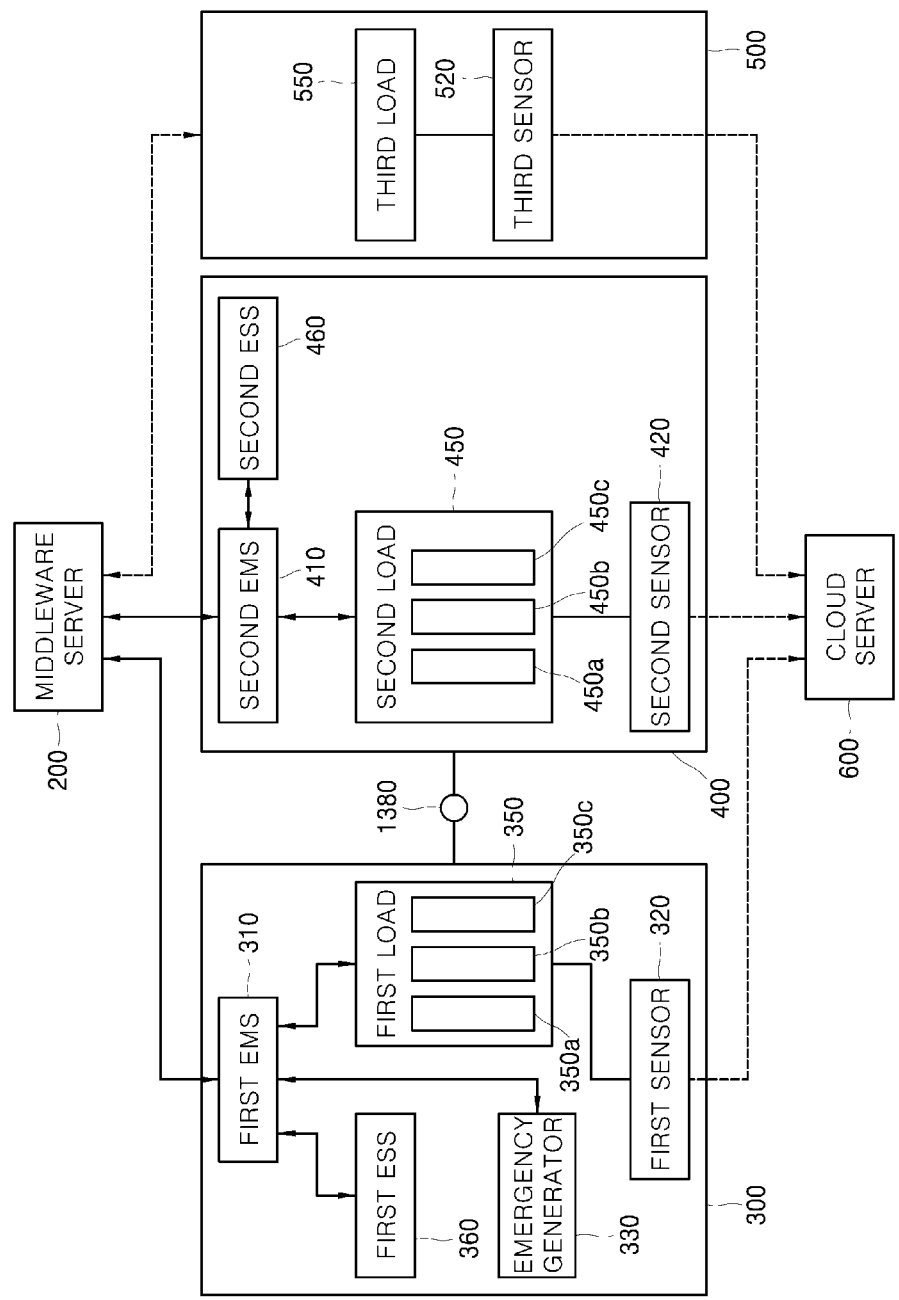
FIG. 24 is a diagram schematically illustrating first to third microgrid cells of FIG. 23.

First, referring to FIGS. 23 and 24, in the hierarchical type power control system 2, the first and second microgrid cells 300 and 400 may be connected to each other through a conversion switch 1380 unlike the hierarchical type power control system 1.

That is, the connection between the first microgrid cell 300 and the second microgrid cell 400 may be opened and closed through the conversion switch 1380.

Such a conversion switch 1380 serves to enable the power interchange between the first microgrid cell 300 and the second microgrid cell 400 by normally blocking the connection between the first microgrid cell 300 and the second microgrid cell 400 and connecting the first microgrid cell 300 and the second microgrid cell 400 to each other when an accident such as the grid interruption occurs.

In addition, the conversion switch 1380 may be, for example, any one of a transfer switch (TS), a static transfer switch (STS), a back-to-back converter, and an automatic load transfer switch (ALTS).

For reference, the conversion switch 1380 may have one end connected to the first ESS 360 and the first load 350, and the other end connected to the second ESS 460 and the second load 450, but is not limited thereto.

In addition, in some situations, an AC-DC converter or a DC-AC converter may be installed on opposite ends of the conversion switch 1380 for changing an AC voltage into a DC voltage or changing the DC voltage into the AC voltage.

Hereinafter, a power interchange method of the hierarchical type power control system of FIG. 23 will be described with reference to FIG. 25.

Figure 25:
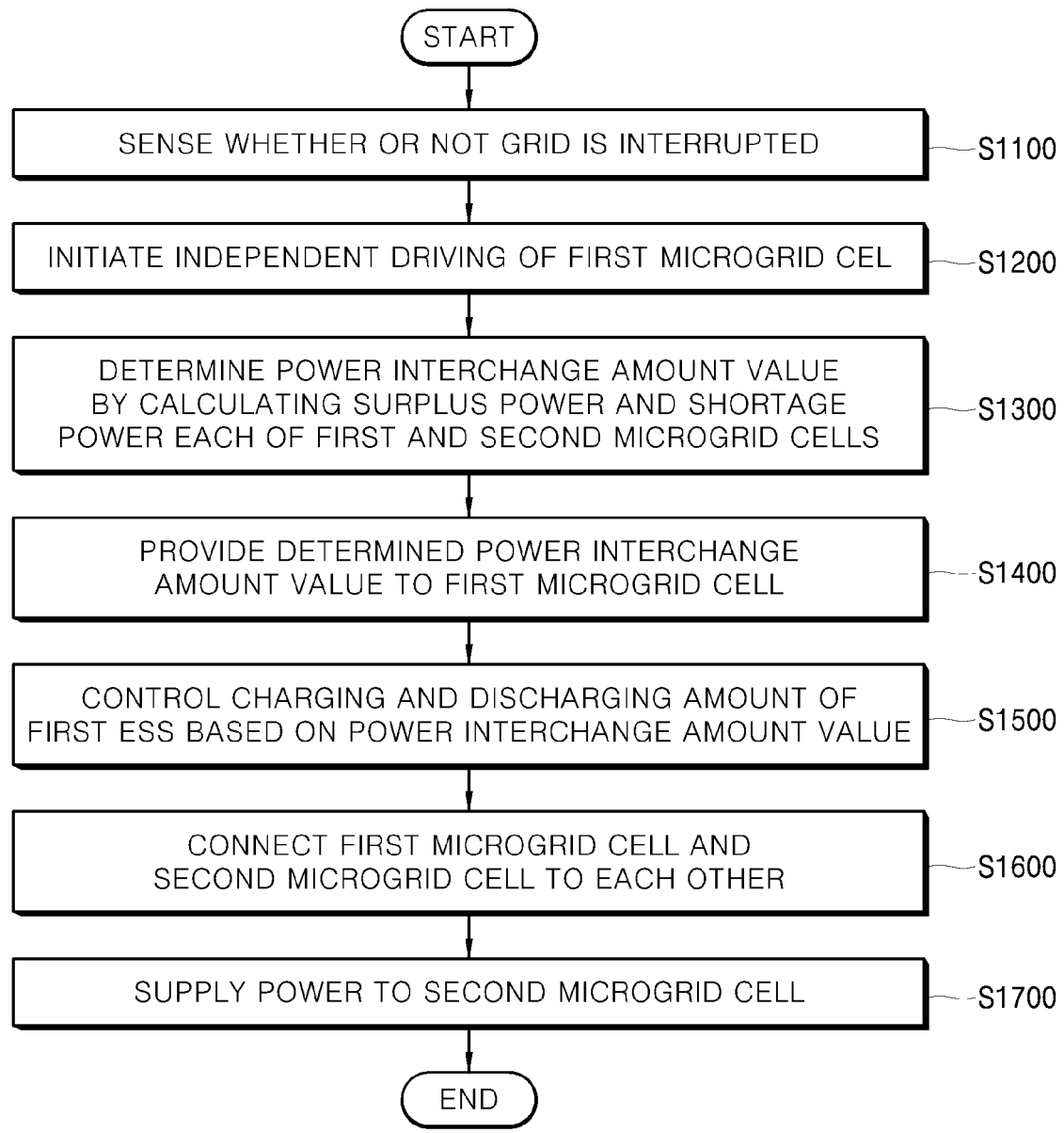
FIG. 25 is a flowchart illustrating a power interchange method of the hierarchical type power control system of FIG. 23.

FIG. 25 is a flowchart illustrating a power interchange method of the hierarchical type power control system of FIG. 23.

Referring to FIGS. 23 to 25, first, it is sensed whether or not the grid is interrupted (S1100).

Specifically, whether or not the grid is interrupted may be sensed by the integrated control system 100 such that a fact that the grid is interrupted may be informed to the first to third microgrid cells 300, 400, and 500 through the middleware server 200, and may also be directly sensed by each of the first to third microgrid cells 300, 400, and 500.

If the fact that the grid is interrupted is sensed (S1100), an independent driving of the first microgrid cell is initiated (S1200).

Specifically, the first microgrid cell 300 may perform an uninterruptible independent driving through the method described above.

That is, the power may be supplied to the first load 350 in an uninterrupted manner through a connection driving between the first ESS 360 and the emergency generator 330 in the first microgrid cell 300.

Of course, when the first microgrid cell 300 does not include the emergency generator 330, the first ESS 360 having the UPS structure may be driven in an independent driving mode to supply the power to the first load 350 in the uninterrupted manner.

If the independent driving of the first microgrid cell 300 is initiated (S1200), a power interchange amount value is determined by calculating surplus power and shortage power of each of the first and second microgrid cells (S1300).

Specifically, the first microgrid cell 300 and the second microgrid cell 400 may provide information on the surplus power and the shortage power thereof to the integrated control system 100 through the middleware server 200.

When the integrated control system 100 receives the information on the surplus power and the shortage power of each of the first microgrid cell 300 and the second microgrid cell 400 through the middleware server 200, the integrated control system 100 may determine the power interchange amount value by calculating the received surplus power and shortage power.

Here, the power interchange amount value may refer to a power amount value that a microgrid cell having surplus power may interchange (provide) to a microgrid cell having shortage power.

If the power interchange amount value is determined (S1300), the integrated control system 100 provides the determined power interchange amount value to the first microgrid cell 300 (S1400).

Specifically, the integrated control system 100 may provide the power interchange amount value to a microgrid cell having the surplus power through the middleware server 200.

For example, since the first microgrid cell 300 may perform an uninterruptible independent driving for a certain time when the grid is interrupted, the first microgrid cell 300 may have the surplus power.

Accordingly, the integrated control system 100 may provide the power interchange amount value to the first microgrid cell having the surplus power through the middleware server 200.

Of course, the second microgrid cell 400 may have the surplus power and the first microgrid cell 300 may have the shortage power, but for convenience of explanation, the present disclosure will describe a situation in which the first microgrid cell 300 has the surplus power and the second microgrid cell 400 has the shortage power when the grid is interrupted, as an example.

If the power interchange amount value is provided to the first microgrid cell (S1400), a charging and discharging amount of the battery 366 of the first ESS 360 is controlled based on the power interchange amount value (S1500).

Specifically, the first EMS 310 may receive the determined power interchange amount value from the middleware server 200 and may transfer the received determined power interchange amount value to the first ESS 360.

The first ESS 360 may control the charging and discharging amount (i.e., one or more of a charging amount and a discharging amount) of the battery 366 based on the transferred power interchange amount value.

If the charging and discharging amount of the battery 366 in the first microgrid cell 300 is controlled (S1500), the first microgrid cell 300 and the second microgrid cell 400 are connected to each other (S1600).

Specifically, the integrated control system 100 may drive the conversion switch 1380 to connect the first microgrid cell 300 and the second microgrid cell 400 to each other.

If the first microgrid cell 300 and the second microgrid cell 400 are connected to each other (S1600), the power is supplied to the second microgrid cell 400 (S1700).

Specifically, if the first microgrid cell 300 and the second microgrid cell 400 are connected to each other, the first ESS 360 may supply the power to the second microgrid cell 400.

In addition, when the integrated control system 100 determines, for example, the power interchange amount value, the integrated control system 100 may determine the power interchange amount value based on a surplus power amount of the first microgrid cell 300 and a shortage power amount that required by the load having the high priority among the second loads 450 in the second microgrid cell 400.

Therefore, if the first microgrid cell 300 and the second microgrid cell 400 are connected to each other, the first ESS 360 may supply the power to the load having the high priority among the second loads 450.

Specifically, if the first ESS 360 supplies the power to the second microgrid cell 400, the second ESS 460 of the second microgrid cell 400 may supply the power to the load having the high priority among the second loads 450 based on the power provided from the first ESS 360.

Of course, the power supplied to the second microgrid cell 400 by the first ESS 360 may also be supplied to the load having the high priority without going through the second ESS 460.

According to the present disclosure as described above, the integrated control system that integrally controls the power supply states of the first to third microgrid cells efficiently performs the power interchange between the microgrid cells at the time of the peak control or the grid interruption, thereby making it possible to solve to the power supply problem.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A hierarchical type power control system connected to a cloud server, the hierarchical type power control system comprising:
    a first microgrid cell including a first energy storage system (ESS) having an uninterruptible power supply (UPS) structure and a first load that a power state thereof is managed by the first ESS;
    a second microgrid cell including a second load and a second ESS managing a power state of the second load;
    a third microgrid cell including a third load;
    a middleware server communicating with the first to third microgrid cells; and
    an integrated control system communicating with the middleware server and integrally controlling power supply states of the first to third microgrid cells,
    wherein the first microgrid cell and the second microgrid cell are connected to each other through a converter to interchange power therebetween, and
    wherein the integrated control system determines a power interchange amount value by calculating surplus power and shortage power of each of the first and second microgrid cells, and provides the determined power interchange amount value to a microgrid cell having the surplus power among the first microgrid cell and the second microgrid cell through the middleware server.

2. The hierarchical type power control system of claim 1, wherein the first microgrid cell further includes a first sensor sensing the power state of the first load,
    the second microgrid cell further includes a second sensor sensing the power state of the second load,
    the third microgrid cell further includes a third sensor sensing a power state of the third load, and
    the first to third sensors sense the power states of the first to third loads, respectively, to transmit the sensed power states to the cloud server.

3. The hierarchical type power control system of claim 2, wherein the cloud server receives at least one of weather data and power related data from the outside, synthetically analyzes the power states of the first to third loads provided from the first to third sensors and at least one of the weather data and the power related data received from the outside, and provides the analysis result to the middleware server.

4. The hierarchical type power control system of claim 3, wherein the middleware server provides the provided analysis result and real time power state information provided from each of the first to third microgrid cells to the integrated control system, and
    the integrated control system integrally controls the power supply states of the first to third microgrid cells based on the analysis result and the real time power state information of the first to third microgrid cells provided from the middleware server.

5. The hierarchical type power control system of claim 1, wherein the first ESS supplies the power to the first load in an uninterrupted manner when a grid is interrupted or restored.

6. The hierarchical type power control system of claim 1, wherein the first microgrid cell further includes:
    an emergency generator;
    a static transfer switch opening and closing a connection between a grid and the first ESS and a connection between the grid and the first load; and
    a first energy management system (EMS) controlling the emergency generator and the first ESS.

7. The hierarchical type power control system of claim 1, wherein when the first microgrid cell has the surplus power,
    the first EMS receives the determined power interchange amount value from the middleware server and transfers the received determined power interchange amount value to the first ESS, and
    the first ESS controls a charging and discharging amount of a battery based on the transferred determined power interchange amount value and then supplies the power to the second microgrid cell through the converter.

8. The hierarchical type power control system of claim 7, wherein the second load includes one or more loads having different priorities,
    the integrated control system determines the power interchange amount value based on a surplus power amount of the first microgrid cell and a shortage power amount required by a load having a high priority among the loads of the second load, and
    the first ESS controls the charging and discharging amount of the battery based on the determined power interchange amount value and then supplies the power to the load having the high priority among the loads of the second load.

9. The hierarchical type power control system of claim 1, wherein the first microgrid cell includes a first EMS that integrally controls the first ESS and the first load,
    when the first microgrid cell has the surplus power,
    the first EMS receives the determined power interchange amount value from the middleware server and transfers the received determined power interchange amount value to the first ESS, and
    the first ESS controls a charging and discharging amount of a battery based on the transferred determined power interchange amount value and then supplies the power to the second microgrid cell through the converter.

10. The hierarchical type power control system of claim 9, wherein the second load includes one or more loads having different priorities,
    the integrated control system determines the power interchange amount value based on a surplus power amount of the first microgrid cell and a shortage power amount required by a load having a high priority among the loads of the second load, and the first ESS controls the charging and discharging amount of the battery based on the determined power interchange amount value and then supplies the power to the load having the high priority among the loads of the second load.

11. The hierarchical type power control system of claim 1, wherein the converter includes an alternating current (AC)-direct current (DC) converter and a DC-AC converter which are connected in series with each other.

12. The hierarchical type power control system of claim 11, wherein when the second microgrid cell has shortage power, the first microgrid cell provides an AC voltage to the AC-DC converter, the AC-DC converter converts the AC voltage provided from the first microgrid cell into a DC voltage to provide the DC voltage to the DC-AC converter, and the DC-AC converter again converts the DC voltage provided from the AC-DC converter into the AC voltage to provide the AC voltage to the second microgrid cell.

13. The hierarchical type power control system of claim 1, wherein a power interchange priority of the first load is higher than the power interchange priority of each of the second load and the third load.

14. The hierarchical type power control system of claim 1, wherein the first microgrid cell further includes:

a building energy management system (BEMS), a panel board communicating with the BEMS, a building automation system (BAS) communicating with the BEMS, a cooling/heating system connected to the BAS, a first distributed power system connected to the BAS, and a third ESS connected to the BAS, and the BEMS reduces a peak load by controlling at least one of the cooling/heating system, the first distributed power system, and the third ESS through the BAS.

15. The hierarchical type power control system of claim 1, wherein the second microgrid cell further includes:

a second distributed power system connected to the second ESS to be driven, and a second EMS controlling the second ESS and the second distributed power system.

16. A hierarchical type power control system connected to a cloud server, the hierarchical type power control system comprising:

a first microgrid cell including an emergency generator, a closed transition transfer switch (CTTS) that opens and closes a connection between the emergency generator and a grid, a first energy storage system (ESS) connected to the emergency generator to be driven, and a first load, wherein a power state of the first load is managed by the first ESS;

a second microgrid cell including a second load and a second ESS managing a power state of the second load;

a third microgrid cell including a third load;

a middleware server communicating with the first to third microgrid cells; and an integrated control system communicating with the middleware server and integrally controlling the first to third microgrid cells, wherein the first microgrid cell and the second microgrid cell are connected to each other through a converter to interchange power therebetween, and wherein the integrated control system determines a power interchange amount value by calculating surplus power and shortage power of each of the first and second microgrid cells, and provides the determined power interchange amount value to a microgrid cell having the surplus power among the first microgrid cell and the second microgrid cell through the middleware server.

17. A hierarchical type power control system connected to a cloud server, the hierarchical type power control system comprising:

a first microgrid cell including a first energy storage system (ESS) having an uninterruptible power supply (UPS) structure and a first load, wherein a power state of the first load is managed by the first ESS;

a second microgrid cell including a second load and a second ESS managing a power state of the second load;

a third microgrid cell including a third load;

a middleware server communicating with the first to third microgrid cells; and an integrated control system communicating with the middleware server and integrally controlling power supply states of the first to third microgrid cells, wherein a connection between the first microgrid cell and the second microgrid cell is opened and closed through a conversion switch, and wherein the integrated control system determines a power interchange amount value by calculating surplus power and shortage power of each of the first and second microgrid cells, and provides the determined power interchange amount value to a microgrid cell having the surplus power among the first microgrid cell and the second microgrid cell through the middleware server.

18. The hierarchical type power control system of claim 17, wherein the conversion switch is any one of a transfer switch (TS), a static transfer switch (STS), a back-to-back converter, and an automatic load transfer switch (ALTS).

* * * * *